United States Patent
Okoshi et al.

(10) Patent No.: US 9,914,461 B2
(45) Date of Patent: Mar. 13, 2018

(54) VEHICLE ROLL ANGLE ESTIMATION DEVICE

(71) Applicant: HONDA MOTOR CO., LTD., Tokyo (JP)

(72) Inventors: Satoru Okoshi, Wako (JP); Toru Takenaka, Wako (JP); Shinya Shirokura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 497 days.

(21) Appl. No.: 14/662,816

(22) Filed: Mar. 19, 2015

(65) Prior Publication Data

US 2015/0274175 A1 Oct. 1, 2015

(30) Foreign Application Priority Data

Mar. 27, 2014 (JP) ................... 2014-067148

(51) Int. Cl.
*B60W 40/112* (2012.01)
*G01B 21/22* (2006.01)
*G01P 21/00* (2006.01)
*B60W 50/00* (2006.01)

(52) U.S. Cl.
CPC ........... *B60W 40/112* (2013.01); *G01B 21/22* (2013.01); *G01P 21/00* (2013.01); *B60W 2050/002* (2013.01); *B60W 2300/36* (2013.01); *B60W 2520/10* (2013.01); *B60W 2520/105* (2013.01); *B60W 2520/125* (2013.01); *B60W 2520/14* (2013.01); *B60W 2520/16* (2013.01); *B60W 2520/18* (2013.01)

(58) Field of Classification Search
CPC ....... B60W 40/112; G01P 21/00; G01B 21/22
See application file for complete search history.

(56) References Cited

U.S. PATENT DOCUMENTS

| | | | |
|---|---|---|---|
| 6,292,759 B1 * | 9/2001 | Schiffmann | B60T 8/172 340/440 |
| 6,631,317 B2 * | 10/2003 | Lu | B60G 17/016 340/440 |
| 7,092,808 B2 * | 8/2006 | Lu | B60R 21/0132 180/271 |
| 7,136,731 B2 * | 11/2006 | Lu | B60R 16/0233 701/38 |
| 7,222,007 B2 * | 5/2007 | Xu | B60G 17/016 180/252 |
| 7,747,367 B2 * | 6/2010 | Ono | B60W 40/11 104/284 |

(Continued)

FOREIGN PATENT DOCUMENTS

JP 2010-149681 7/2010

*Primary Examiner* — Thomas G Black
*Assistant Examiner* — Peter D Nolan
(74) *Attorney, Agent, or Firm* — Rankin, Hill & Clark LLP

(57) ABSTRACT

A device that can stably and accurately estimate the roll angle of a vehicle body during various states of movement of the vehicle body. A roll angle estimated value calculation portion calculates an estimated value of the roll angle by integrating a value obtained by correcting an estimated value of roll angle velocity of a vehicle body by use of a correction value, or by correcting a value obtained by integrating an estimated value of roll angle velocity by use of a correction value. The correction value is calculated by use of a detection value of speed of the vehicle body in the traveling direction, detection values of angular velocity and acceleration detected by sensors mounted on the vehicle body, a previous estimated value of the roll angle, and a previous estimated value of the pitch angle of the vehicle body.

20 Claims, 7 Drawing Sheets

(56) References Cited

U.S. PATENT DOCUMENTS

| | | | | |
|---|---|---|---|---|
| 8,155,798 | B2* | 4/2012 | Seiniger | B60T 8/1706 |
| | | | | 701/1 |
| 8,200,452 | B2* | 6/2012 | Ueda | B60W 40/12 |
| | | | | 180/197 |
| 9,630,672 | B2* | 4/2017 | Inoue | B62J 27/00 |
| 9,758,205 | B2* | 9/2017 | Ono | B62J 27/00 |
| 2003/0065430 | A1* | 4/2003 | Lu | B60G 17/016 |
| | | | | 701/45 |
| 2004/0249545 | A1* | 12/2004 | Lu | B60R 21/0132 |
| | | | | 701/70 |
| 2005/0149240 | A1* | 7/2005 | Tseng | B60G 17/016 |
| | | | | 701/38 |
| 2007/0156316 | A1* | 7/2007 | Ono | B60W 40/11 |
| | | | | 701/38 |
| 2009/0103319 | A1* | 4/2009 | Peeters | B60Q 1/12 |
| | | | | 362/465 |
| 2009/0222164 | A1* | 9/2009 | Seiniger | B60T 8/1706 |
| | | | | 701/36 |
| 2009/0326858 | A1* | 12/2009 | Ueda | B60W 40/12 |
| | | | | 702/141 |
| 2011/0040464 | A1* | 2/2011 | Ono | G01C 19/00 |
| | | | | 701/70 |
| 2012/0109485 | A1* | 5/2012 | Obuchi | B60W 40/11 |
| | | | | 701/72 |
| 2012/0259526 | A1* | 10/2012 | Inoue | B60W 40/112 |
| | | | | 701/70 |
| 2016/0001783 | A1* | 1/2016 | Ammon | B60W 40/06 |
| | | | | 701/1 |

* cited by examiner

VEHICLE ROLL ANGLE ESTIMATION DEVICE

BACKGROUND OF THE INVENTION

Field of the Invention

The present invention relates to a device for estimating the roll angle of a vehicle body such as a motorcycle.

Description of Related Art

There are many cases where the roll angle (angle of tilt in the roll direction) of a vehicle body such as a motorcycle needs to be estimated successively in real time. For example, there is a case where estimated values of the roll angle of a vehicle body are required for traction control of a driving wheel of a motorcycle.

Japanese Patent Application Publication No. 2010-149681 proposes a technique of estimating the roll angle ("bank angle" in the description of Japanese Patent Application Publication No. 2010-149681) of a vehicle body to control the illumination range of a headlamp of a motorcycle, for example.

In this technique, an estimated value of the roll angle is calculated by: correcting a detection value of the roll rate by use of a correction amount, which is calculated so as to be approximated to a value of the roll angle in a state where a moment in the roll direction due to centrifugal force and a moment in the roll direction due to gravity obtained from detection values of yaw rate and vehicle speed are balanced; and integrating the corrected value.

In the technique proposed in Japanese Patent Application Publication No. 2010-149681, an estimated value of the roll angle is calculated by setting, as a convergence target value, a value of the roll angle in a state where a moment in the roll direction due to centrifugal force and a moment in the roll direction due to gravity are balanced.

Hence, there is a problem that an error in the estimated value of the roll angle tends to become large during slalom riding or in the transition period of a turning motion, when the roll angle of the vehicle body is not kept constant or substantially constant.

SUMMARY OF THE INVENTION

The present invention has been made in view of the foregoing, and aims to provide a device that can stably and accurately estimate the roll angle of a vehicle body during various states of movement of the vehicle body.

To achieve the above objective, a vehicle roll angle estimation device of the present invention is a device for successively estimating a roll angle of a vehicle body characterized by including:

an acceleration and angular velocity detector including an acceleration sensor and an angular velocity sensor mounted on the vehicle body, and when an axis extending in the front-rear direction of the vehicle body, an axis extending in the vehicle width direction of the vehicle body, and an axis extending in the up-down direction of the vehicle body are respectively defined as an x axis, a y axis, and a z axis of a local coordinate system fixed to the vehicle body, configured to be capable of detecting x-axis acceleration, which is acceleration in the x-axis direction, y-axis acceleration, which is acceleration in the y-axis direction, x-axis angular velocity, which is angular velocity about the x axis, and z-axis angular velocity, which is angular velocity about the z axis;

a vehicle speed detector configured to detect speed of the vehicle body in the traveling direction;

a pitch angle estimator configured to successively estimate a pitch angle of the vehicle body, and calculate an estimated value of the current pitch angle by use of a detection value of speed in the traveling direction detected by the vehicle speed detector, a detection value of x-axis acceleration detected by the acceleration and angular velocity detector, and a previous estimated value of the pitch angle;

roll angle velocity estimator configured to successively estimate roll angle velocity of the vehicle body, and calculate an estimated value of the current roll angle velocity by use of detection values of x-axis angular velocity and z-axis angular velocity detected by the acceleration and angular velocity detector, a previous estimated value of the roll angle, and a previous estimated value of the pitch angle estimated by the pitch angle estimator;

a correction value calculator configured to successively calculate a correction value for estimating the roll angle of the vehicle body, and calculate the correction value by use of a detection value of speed in the traveling direction detected by the vehicle speed detector, detection values of z-axis angular velocity and y-axis acceleration detected by the acceleration and angular velocity detector, a previous estimated value of the roll angle, and a previous estimated value of the pitch angle estimated by the pitch angle estimator; and a roll angle estimated value calculator configured to calculate an estimated value of the current roll angle of the vehicle body by integrating a value obtained by correcting an estimated value of roll angle velocity estimated by the roll angle velocity estimator by use of a calculated value of the correction value calculated by the correction value calculator, or by correcting a value obtained by integrating an estimated value of the roll angle velocity estimated by the roll angle velocity estimator by use of a calculated value of the correction value calculated by the correction value calculator.

Note that in the present invention, "previous estimated value" refers to an estimated value obtained in the previous arithmetic processing period, among arithmetic processing periods for estimating the roll angle of the vehicle body.

According to one aspect of the invention, in the processing of the pitch angle estimator, an estimated value of the pitch angle is calculated by use of a detection value of speed of the vehicle body in the traveling direction, a detection value of x-axis acceleration, and a previous estimated value of the pitch angle. Hence, an estimated value of the pitch angle can be calculated accurately during various states of movement of the vehicle body, without requiring integration operation.

Then, in the processing of the roll angle velocity estimator, a previous estimated value of the roll angle, a previous estimated value of the pitch angle, and a detection value of z-axis angular velocity are used in addition to x-axis angular velocity. Hence, an estimated value of roll angle velocity can be calculated accurately regardless of whether or not the vehicle body is tilted in the pitch direction.

Also, in the processing of the correction value calculator, a detection value of speed of the vehicle body in the traveling direction, detection values of z-axis angular velocity and y-axis acceleration, a previous estimated value of the roll angle, and a previous estimated value of the pitch angle are used. Hence, even if error may be accumulated in the value obtained by integrating an estimated value of roll angle velocity, a correction value that can appropriately reduce the error can be calculated during various states of movement of the vehicle body.

Additionally, in the processing of the roll angle estimated value calculator, an estimated value of the roll angle is calculated by integrating a value obtained by correcting an estimated value of roll angle velocity by use of a calculated value of the correction value, or by correcting a value obtained by integrating an estimated value of roll angle velocity by use of a calculated value of the correction value.

Thus, according to the present invention, the roll angle of the vehicle body can be estimated stably and accurately during various states of movement of the vehicle body.

In accordance with the present invention, it is preferable that the correction value calculator be configured to calculate an estimated value of the y-axis acceleration by use of a detection value of speed in the traveling direction detected by the vehicle speed detector, a detection value of z-axis angular velocity detected by the acceleration and angular velocity detector, a previous estimated value of the roll angle, and a previous estimated value of the pitch angle estimated by the pitch angle estimator, and then calculate the correction value according to a deviation between a detection value of y-axis acceleration detected by the acceleration and angular velocity detector and the estimated value of the y-axis acceleration, in such a manner as to bring the deviation closer to zero by a feedback control law.

Here, since an estimated value of the y-axis acceleration is affected by error in an estimated value of the roll angle, a deviation between a detection value of y-axis acceleration detected by the acceleration and angular velocity detector and the estimated value thereof corresponds to error in the estimated value of the roll angle.

Accordingly, by calculating the correction value according to the deviation in such a manner as to bring the deviation closer to zero by a feedback control law, it is possible to calculate an appropriate correction value that can bring error in an estimated value of the roll angle closer to zero during various states of movement of the vehicle body. Therefore, stability in accuracy of an estimated value of the roll angle can be improved.

In accordance with the present invention, it is preferable that x-axis acceleration error component estimator configured to estimate an x-axis acceleration error component, which is a steady-state error component included in a detection value of x-axis acceleration detected by the acceleration and angular velocity detector, be further provided, and the pitch angle estimator be configured to include, as part of processing performed to calculate an estimated value of the pitch angle, processing for eliminating an estimated value of the x-axis acceleration error component estimated by the x-axis acceleration error component estimator from a detection value of x-axis acceleration detected by the acceleration and angular velocity detector.

And in this case, it is preferable that the x-axis acceleration error component estimator include error index value calculator for calculating an error index value, which varies according to the x-axis acceleration error component at the time of a turning motion of the vehicle body, by use of a previous estimated value of roll angle velocity estimated by the roll angle velocity estimator, a previous estimated value of the pitch angle estimated by the pitch angle estimator, a previous estimated value of the roll angle calculated by the roll angle estimated value calculator, detection values of y-axis acceleration and z-axis angular velocity detected by the acceleration and angular velocity detector, and a detection value of speed in the traveling direction detected by the vehicle speed detector, and be configured to determine an estimated value of the x-axis acceleration error component in such a manner as to bring the error index value calculated by the error index value calculator closer to zero, during a predetermined time period immediately after start of a turning motion of the vehicle body.

Specifically, according to experiments and studies carried out by the inventors of the present application, the error index value, which is an index vale likely to be affected by the x-axis acceleration error component at the time of a turning motion of the vehicle body, can be calculated by use of a previous estimated value of roll angle velocity, a previous estimated value of the pitch angle, a previous estimated value of the roll angle, detection values of y-axis acceleration and z-axis angular velocity, and a detection value of speed in the traveling direction detected by the vehicle speed detector.

Then, an estimated value of the x-axis acceleration error component can be obtained appropriately by determining the estimated value of the x-axis acceleration error component in such a manner as to bring the error index value calculated by the error index value calculator closer to zero, during a predetermined time period immediately after start of a turning motion of the vehicle body.

Therefore, in the processing of the pitch angle estimator, an estimated value of the x-axis acceleration error component can be appropriately eliminated from a detection value of x-axis acceleration, so that the x-axis acceleration error component does not affect an estimated value of the pitch angle. As a result, accuracy in estimation of the pitch angle can be enhanced even more.

In further accordance with the present invention, it is preferable that the x-axis acceleration error component estimator be configured to calculate, as an estimated value of the x-axis acceleration error component, a value obtained by integrating the error index value during a predetermined time period immediately after start of a turning motion of the vehicle body.

Accordingly, determination of an estimated value of the x-axis acceleration error component in such a manner as to bring the error index value closer to zero can be appropriately achieved, by integrating the error index value during the predetermined time period immediately after start of a turning motion of the vehicle body.

In further accordance with the present invention, it is preferable that the error index value calculator include first filter for extracting a deviation variable component, which is a component that varies according to a turning motion of the vehicle body, from a deviation between the time rate of change of y-axis acceleration calculated from a previous estimated value of roll angle velocity estimated by the roll angle velocity estimator, a previous estimated value of the pitch angle estimated by the pitch angle estimator, and a previous estimated value of the roll angle calculated by the roll angle estimated value calculator, and the time rate of change of y-axis acceleration calculated from detection values of the y-axis acceleration and z-axis angular acceleration detected by the acceleration and angular velocity detector, a previous estimated value of roll angle velocity estimated by the roll angle velocity estimator, a previous estimated value of the pitch angle estimated by the pitch angle estimator, and a detection value of speed in the traveling direction detected by the vehicle speed detector, as well as a second filter for extracting a z-axis angular velocity variable component, which is a component that varies according to a turning motion of the vehicle, from a detection value of z-axis angular velocity detected by the acceleration and angular velocity detector, and be configured to calculate, as the error index value, a value obtained by multiplying the deviation variable component extracted by the first filter by the z-axis angular velocity variable component extracted by the second filter.

In further accordance with the present invention, an error index value suitable for calculating a highly reliable estimated value of the x-axis acceleration error component can be calculated.

Further, it is preferable that a predetermined time period immediately after start of a turning motion of the vehicle body be a time period in which a product of a detection value of z-axis angular velocity detected by the acceleration and angular velocity detector and the time rate of change of the detection value is a positive value not less than a predetermined value.

In further accordance with the present invention, it is possible to appropriately set the predetermined time period, for performing the processing of determining an estimated value of the x-axis acceleration error component in such a manner as to bring the error index value closer to zero.

Additionally, it is preferable that a y-axis acceleration error component estimator configured to estimate a y-axis acceleration error component, which is a steady-state error component included in a detection value of y-axis acceleration detected by the acceleration and angular velocity detector, be further provided, and the correction value calculator be configured to include, as part of processing performed to calculate the correction value, processing for eliminating an estimated value of the y-axis acceleration error component estimated by the y-axis acceleration error component estimator from a detection value of y-axis acceleration detected by the acceleration and angular velocity detector.

Then, in this case, it is preferable that the y-axis acceleration error component estimator include forward travel determination device for determining whether or not the vehicle body is in a forward-traveling state, and be configured to obtain an estimated value of the y-axis acceleration error component on the basis of a detection value of y-axis acceleration detected by the acceleration and angular velocity detector, in a state where it is determined by the forward travel determination device that the vehicle body is in a forward-traveling state (Seventh Invention).

Here, a forward-traveling state of the vehicle body is a state where the actual value of y-axis acceleration is zero or within a predetermined range. Accordingly, if a detection value of y-axis acceleration detected by the acceleration and angular velocity detector is not zero or within the predetermined range, the detection value is equivalent to the y-axis acceleration error component.

Accordingly, an estimated value of the y-axis acceleration error component can be obtained appropriately, on the basis of a detection value of y-axis acceleration detected by the acceleration and angular velocity detector in a state where it is determined by the forward travel determination device that the vehicle body is in a forward-traveling state.

Therefore, in the processing of the correction value calculator, an estimated value of the y-axis acceleration error component can be appropriately eliminated from a detection value of y-axis acceleration, so that the y-axis acceleration error component does not affect the correction value. As a result, reliability in the calculated value of the correction value calculated by the correction value calculator can be enhanced even more.

In further accordance with the present invention, it is preferable that the forward travel determination device be configured to determine that the vehicle body is in a forward-traveling state when the following conditions are satisfied: a detection value of speed in the traveling direction detected by the vehicle speed detector is not lower than a predetermined speed; and a product of a detection value of z-axis angular velocity detected by the acceleration and angular velocity detector and a detection value of speed in the traveling direction detected by the vehicle speed detector is not larger than a predetermined value.

In further accordance with the present invention, whether the vehicle body is in a forward-traveling state or not can be determined highly reliably. Therefore, reliability in an estimated value of the y-axis acceleration error component can be enhanced.

BRIEF DESCRIPTION OF THE DRAWINGS

These and further features of the invention will be apparent with to reference to the following description and drawings, wherein.

DETAILED DESCRIPTION OF THE INVENTION

An embodiment of the present invention will be described below with reference to FIGS. 1 to 6.

Figure 1:
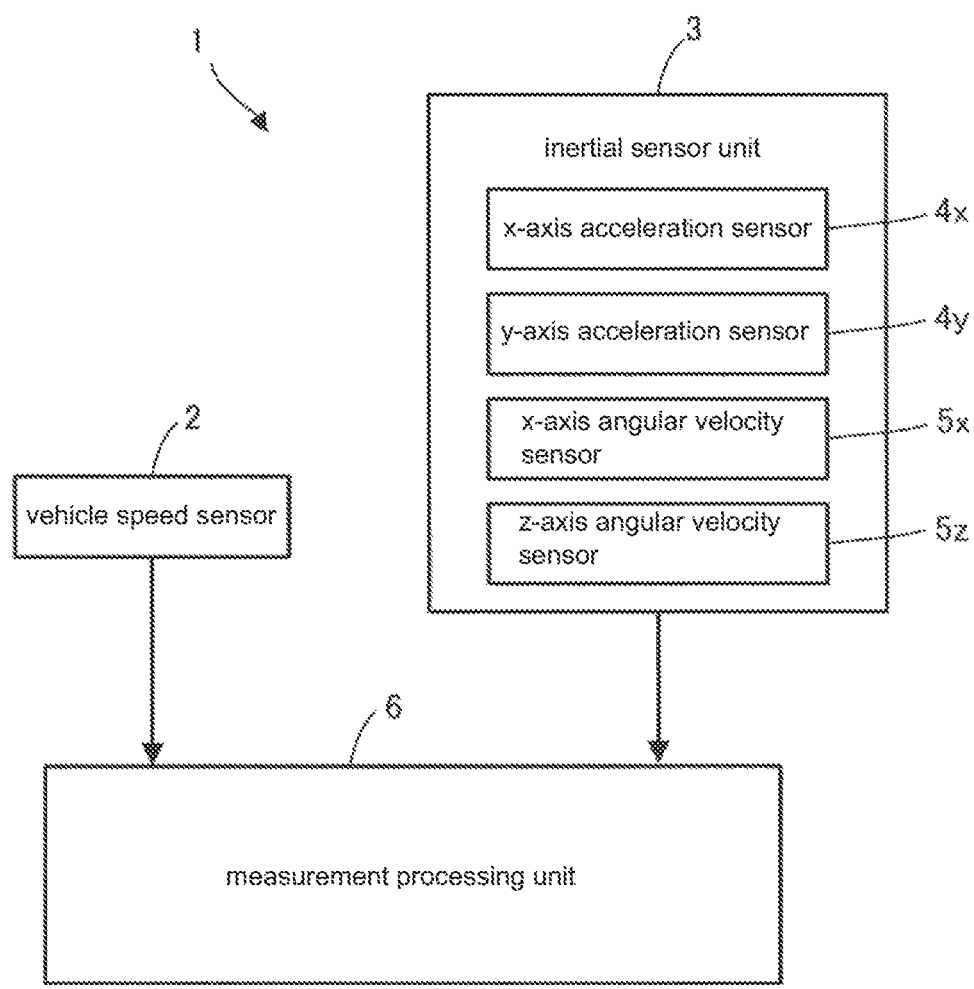
FIG. 1 is a block diagram showing an entire configuration of a roll angle estimation device of an embodiment of the present invention.
Figure 2:
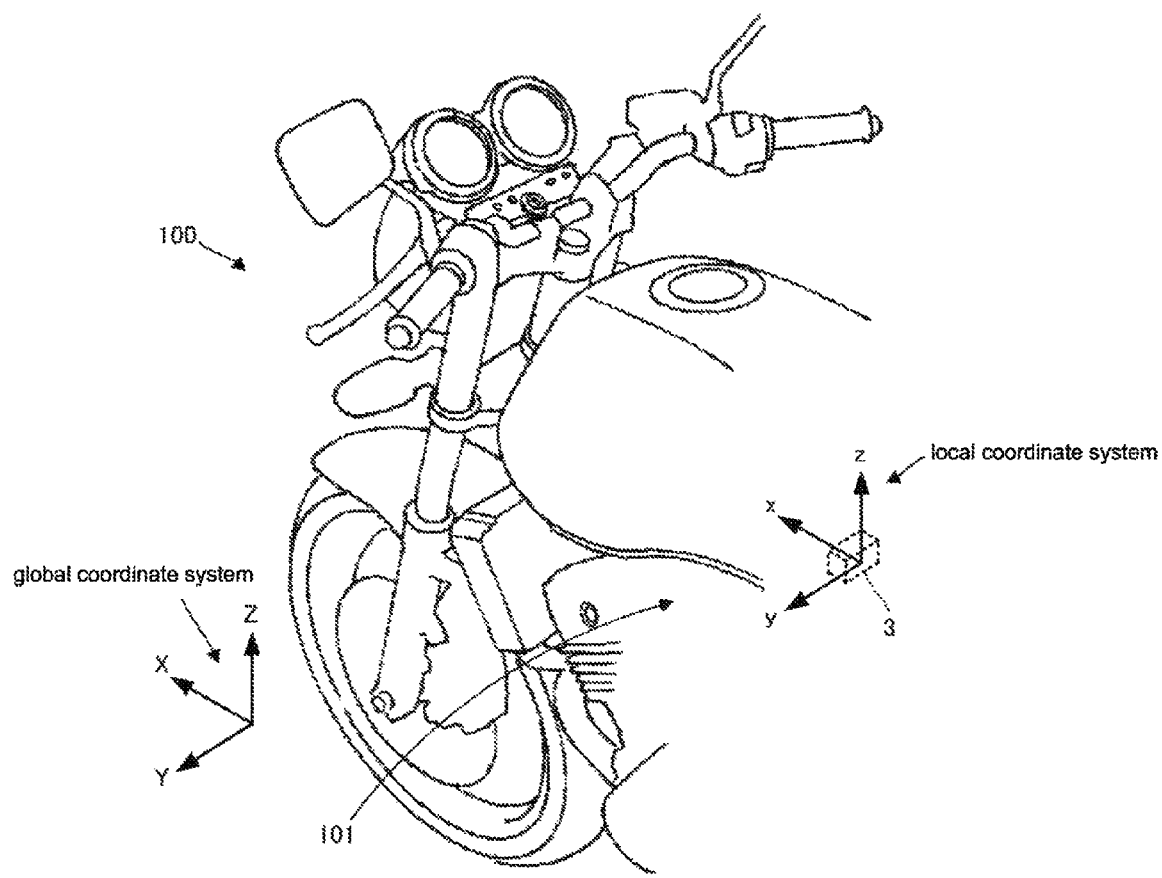
FIG. 2 is a perspective view partially showing a motorcycle on which the roll angle estimation device of the embodiment is mounted.

Referring to FIGS. 1 and 2, a roll angle estimation device 1 of the embodiment is mounted on a motorcycle 100 as shown in FIG. 2, as a device for estimating the roll angle of a vehicle body 101 of the motorcycle 100.

Here, a description will be given of a local coordinate system and a global coordinate system as shown in FIG. 2, which are assumed in the following description of the embodiment.

A local coordinate system is a coordinate system fixed to the vehicle body 101 (coordinate system moving together with the vehicle body 101). As shown in FIG. 2, the local coordinate system is defined as an xyz Cartesian coordinate system including: an axis extending in the front-rear direction of the vehicle body 101 as an x axis; an axis extending in the vehicle width direction of the vehicle body 101 as a y axis; and an axis extending in the up-down direction of the vehicle body 101 as a z axis.

Meanwhile, the global coordinate system is an inertial coordinate system for expressing a state of movement of the vehicle body 101 as seen from a traveling environment of the motorcycle 100 (moving environment of the vehicle body 101). The global coordinate system is defined as an XYZ Cartesian coordinate system including: as an X-axis, a horizontal axis in the same direction as an axis obtained by projecting the x-axis of the local coordinate system on a horizontal plane; as a Y-axis, a horizontal axis in the same direction as an axis obtained by projecting the y-axis of the local coordinate system on a horizontal plane; and an axis in the vertical direction (direction of gravity) as a Z-axis.

In this case, when the motorcycle 100 is held still in an upright position on a horizontal plane, the x-axis direction, y-axis direction, and z-axis direction of the local coordinate system respectively coincide with the X-axis direction, Y-axis direction, and Z-axis direction of the global coordinate system.

Incidentally, the global coordinate system defined as above is a coordinate system that moves along with the movement of the vehicle body 101, and is not a coordinate system that is always fixed to the road surface.

In addition, the roll angle, pitch angle, and yaw angle of the vehicle body 101 are expressed as the angle of rotation about the X-axis of the global coordinate system, the angle of rotation about the Y-axis thereof, and the angle of rotation about the Z-axis thereof, respectively. In the embodiment, the roll angle, pitch angle, and yaw angle of the vehicle body 101 are angles expressed as Euler angles.

The roll angle estimation device 1 will be described in detail on the above assumption.

As shown in FIG. 1, the roll angle estimation device 1 includes: a vehicle speed sensor 2 for detecting vehicle speed as speed of the vehicle body 101 in the traveling direction; an inertial sensor unit 3 for detecting acceleration and angular velocity generated in the vehicle body 101; and a measurement processing unit 6 for performing processes such as estimating the roll angle on the basis of detection signals inputted from the vehicle speed sensor 2 and the inertial sensor unit 3.

The vehicle speed sensor 2 is vehicle speed detector or vehicle speed detection means of the present invention. The vehicle speed sensor 2 is configured of a rotational speed sensor such as a rotary encoder, which outputs a detection signal according to the rotation speed of a rear wheel (not shown) of the motorcycle 100, for example. In this case, the wheel speed of the rear wheel (movement speed caused by rotation of the rear wheel) corresponding to a detection value of the rotation speed of the rear wheel is obtained as a detection value of vehicle speed.

Note that the rotation speed of both the front and rear wheels may be detected, and detection values of the rotation speeds thereof may be used to calculate vehicle speed. Moreover, the vehicle speed sensor 2 may be other types of sensors (e.g., a vehicle speed sensor using GPS), as long as it is capable of detecting speed of the vehicle body 101 in the traveling direction.

The inertial sensor unit 3 is the acceleration and angular velocity detector of the present invention. As shown in FIG. 2, the inertial sensor unit 3 is fixed to any appropriate part of the vehicle body 101. In the embodiment, the inertial sensor unit 3 includes, in its housing, an x-axis acceleration sensor 4x for detecting translational acceleration in the x-axis direction of the local coordinate system (hereinafter referred to as x-axis acceleration), a y-axis acceleration sensor 4y for detecting translational acceleration in the y-axis direction thereof (hereinafter referred to as y-axis acceleration), an x-axis angular velocity sensor 5x for detecting angular velocity about the x-axis thereof (hereinafter referred to as x-axis angular velocity), and a z-axis angular velocity sensor 5z for detecting angular velocity about the z-axis thereof (hereinafter referred to as z-axis angular velocity).

This configuration allows the inertial sensor unit 3 to detect acceleration in the axial direction of each of the x and y axes, as well as angular velocity about each of the x and z axes generated in the vehicle body 101. Note that when the vehicle body 101 is tilted in the roll or pitch direction, the x-axis acceleration or y-axis acceleration detected by the inertial sensor unit 3 includes an acceleration component resulting from gravity.

Incidentally, the x-axis acceleration sensor 4x and the y-axis acceleration sensor 4y may be configured integrally, as a single acceleration sensor having two detection axes. Similarly, the x-axis angular velocity sensor 5x and the z-axis angular velocity sensor 5z may be configured integrally, as a single angular velocity sensor having two detection axes.

Moreover, instead of the x-axis acceleration sensor 4x and the y-axis acceleration sensor 4y, the inertial sensor unit 3 may include an acceleration sensor for detecting acceleration in each of directions of two non-parallel axes (not necessarily orthogonal to each other) on the xy plane of the local coordinate system. Here, at least one of these two axes differs from the x and y axes. Even in this case, a detection value of acceleration in each of x and y-axis directions can be obtained unambiguously, by performing coordinate transformation from a set of detection values of acceleration in the two axial directions.

Such a case may be regarded as equivalent to including the x-axis acceleration sensor and the y-axis acceleration sensor.

Similarly, instead of the x-axis angular velocity sensor 5x and the z-axis angular velocity sensor 5z, the inertial sensor unit 3 may include an angular velocity sensor for detecting angular velocity about each of two non-parallel axes (not necessarily orthogonal to each other) on the xz plane of the local coordinate system. Here, at least one of these axes differs from the x and z axes.

Such a case may be regarded as equivalent to including the x-axis angular velocity sensor and the z-axis angular velocity sensor.

The measurement processing unit 6 is configured of an electronic circuit unit including a CPU, a RAM, a ROM, an interface circuit, and the like, and is mounted on any appropriate part of the motorcycle 100. Note that the measurement processing unit 6 may be configured of multiple mutually communicable electronic circuit units.

Figure 3:
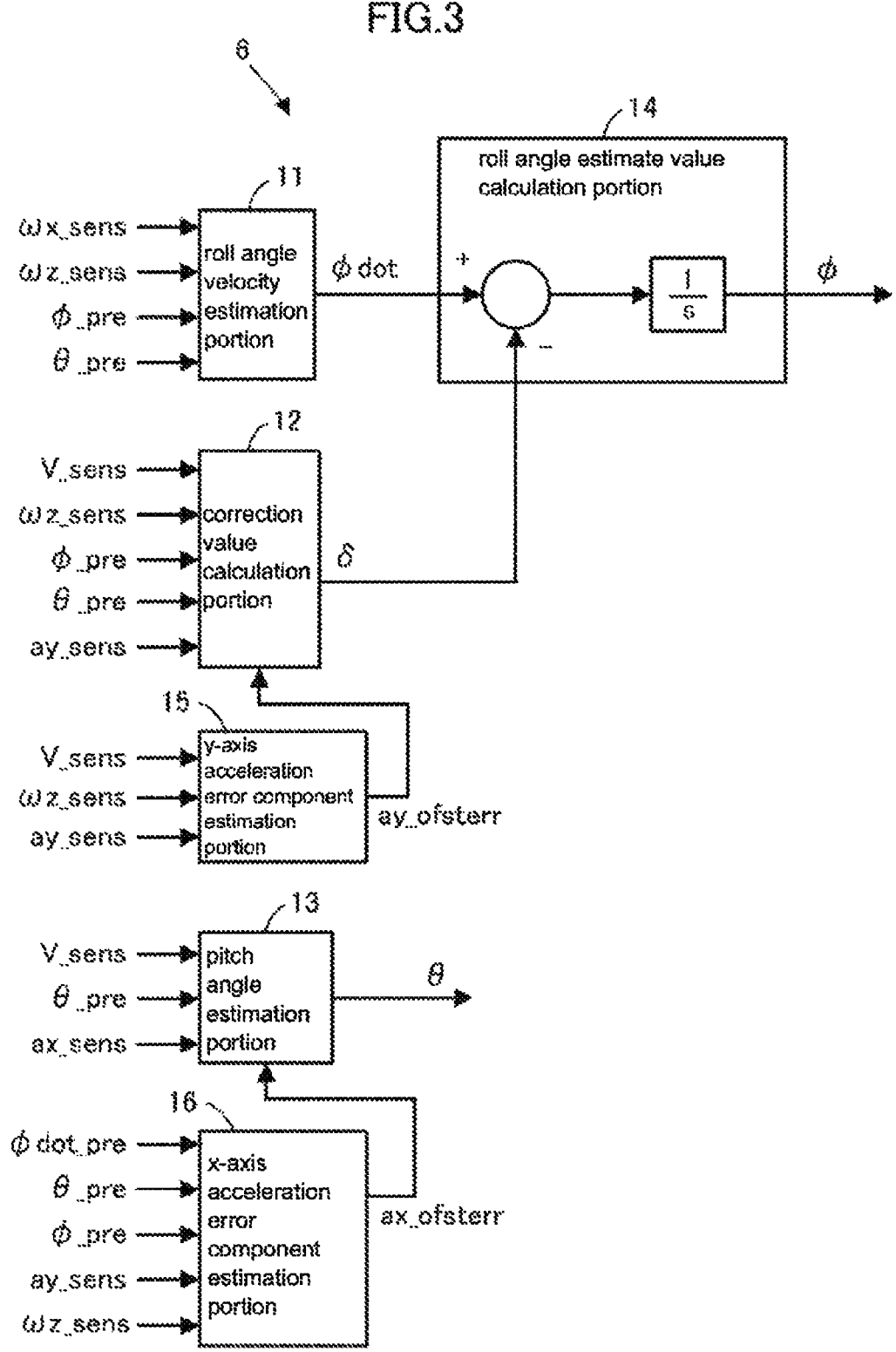
FIG. 3 is a block diagram showing a functional configuration of a measurement processing unit shown in FIG. 1.

The measurement processing unit 6 has functions shown in the block diagram of FIG. 3, as functions implemented by an installed program or functions implemented by a hardware configuration.

Specifically, the measurement processing unit 6 includes as main function portions: a roll angle velocity estimation portion 11 for estimating a roll angle velocity φdot (time rate of change in a roll angle φ) of the vehicle body 101, a correction value calculation portion 12 for calculating a correction value δ, which is an operation amount for reducing error in an estimated value of the roll angle φ of the vehicle body 101, a pitch angle estimation portion 13 for estimating a pitch angle θ of the vehicle body 101, and a roll angle estimated value calculation portion 14 for calculating an estimated value of the roll angle φ of the vehicle body 101.

In this case, the roll angle estimated value calculation portion 14 calculates an estimated value of the roll angle φ on the basis of an estimated value of the roll angle velocity φdot estimated by the roll angle velocity estimation portion 11, and a calculated value of the correction value δ calculated by the correction value calculation portion 12. An estimated value of the pitch angle θ estimated by the pitch angle estimation portion 13 is used in processing of the roll angle velocity estimation portion 11 and the correction value calculation portion 12.

The measurement processing unit 6 further includes: a y-axis acceleration error component estimation portion 15 for estimating a y-axis acceleration error component ay_ofsterr, which is a steady-state error component (error component resulting from drift in the output of the y-axis acceleration sensor 4y and the like) included in a detection value of y-axis acceleration based on a detection signal of the inertial sensor unit 3; and an x-axis acceleration error component estimation portion 16 for estimating an x-axis acceleration error component ax_ofsterr, which is a steady-state error component (error component resulting from drift in the output of the x-axis acceleration sensor 4x and the like) included in a detection value of x-axis acceleration based on a detection signal of the inertial sensor unit 3.

An estimated value of the y-axis acceleration error component ay_ofsterr estimated by the y-axis acceleration error component estimation portion 15 is used in processing of the correction value calculation portion 12. Also, an estimated value of the x-axis acceleration error component ax_ofsterr estimated by the x-axis acceleration error component estimation portion 16 is used in processing of the pitch angle estimation portion 13.

The roll angle velocity estimation portion 11, the correction value calculation portion 12, the pitch angle estimation portion 13, the roll angle estimated value calculation portion 14, the y-axis acceleration error component estimation portion 15, and the x-axis acceleration error component estimation portion 16 are roll angle velocity estimator, correction value calculator, pitch angle estimator, roll angle estimated value calculator, y-axis acceleration error component estimator, and x-axis acceleration error component estimator of the present invention, respectively.

Note that the measurement processing unit 6 may include functions other than the function of estimating the roll angle φ (e.g., operation control function of the motorcycle 100). Otherwise, the aforementioned function portions of the measurement processing unit 6 may be included as some of functions of a control device performing operation control and the like of the motorcycle 100.

Here, before specifically describing processing of the measurement processing unit 6, basic equations related to the processing will be shown.

If an angular velocity vector of the vehicle body 101 described above in the local coordinate system is expressed as $[\omega x\ \omega y\ \omega z]^T$, and an angular velocity vector of the vehicle body 101 described above in the global coordinate system is expressed as $[\phi dot\ \theta dot\ \psi dot]^T$, the relation between $[\omega x\ \omega y\ \omega z]^T$ and $[\phi dot\ \theta dot\ \psi dot]^T$ is expressed by the following equation (1). Note that the superscript T indicates transposition.

Additionally, if an acceleration vector of the vehicle body 101 described above in the local coordinate system is expressed as $[ax\ ay\ az]^T$, and an acceleration vector of the vehicle body 101 described above in the global coordinate system is expressed as $[Ax\ Ay\ Az]^T$, the relation between $[ax\ ay\ az]^T$ and $[Ax\ Ay\ Az]^T$ is expressed by the following equation (2). Note that in equation (2), Az approximately coincides with standard gravity g.

$$\begin{bmatrix} \phi\,dot \\ \theta\,dot \\ \psi\,dot \end{bmatrix} = \begin{bmatrix} 1 & \sin\phi\cdot\tan\theta & \cos\phi\cdot\tan\theta \\ 0 & \cos\phi & -\sin\phi \\ 0 & \sin\phi/\cos\theta & \cos\phi/\cos\theta \end{bmatrix} \cdot \begin{bmatrix} \omega x \\ \omega y \\ \omega z \end{bmatrix} \quad (1)$$

$$\begin{bmatrix} ax \\ ay \\ az \end{bmatrix} = \begin{bmatrix} \cos\theta & 0 & -\sin\theta \\ \sin\phi\cdot\sin\theta & \cos\phi & \sin\phi\cdot\cos\theta \\ \cos\phi\cdot\sin\theta & -\sin\phi & \cos\phi\cdot\cos\theta \end{bmatrix} \cdot \begin{bmatrix} Ax \\ Ay \\ g \end{bmatrix} \quad (2)$$

Here, φ, θ, and ψ in equations (1) and (2) respectively indicate the roll angle (tilt angle about the X axis) of the vehicle body 101, the pitch angle (tilt angle about the Y axis) of the vehicle body 101, and the yaw angle (rotation angle about the Z axis) of the vehicle body 101 described above in the global coordinate system. These angles are expressed as Euler angles related to coordinate transformation between the local coordinate system and the global coordinate system.

In other words, φdot, θdot, and ψdot are: a roll angle velocity as the time rate of change in the roll angle φ (=dφ/dt), a pitch angle velocity as the time rate of change in the pitch angle θ (=dθ/dt), and a yaw angle velocity as the time rate of change in the yaw angle ψ (=dψ/dt), respectively.

In the embodiment, the measurement processing unit 6 estimates the roll angle φ by performing processing formulated on the basis of the above equations (1) and (2).

Note that in the embodiment, ωx, ωz, ax, and ay in the equations (1) and (2) respectively indicate x-axis angular velocity, z-axis angular velocity, x-axis acceleration, and y-axis acceleration detected by the inertial sensor unit 3.

Incidentally, a general acceleration sensor is configured to detect acceleration at a certain reference point. The reference point will hereinafter be referred to as a detection reference point. In the embodiment, the detection reference point of the acceleration sensors 4x, 4y is the ground contact point of the rear wheel. Note, however, that the detection reference point need not be the ground contact point of the rear wheel.

If the detection reference point of the acceleration sensors 4x, 4y is not at the ground contact point of the rear wheel, a detection value of acceleration may be converted into acceleration at the ground contact point of the rear wheel by use of a detection value of angular acceleration, which is a differential value (time rate of change) of a detection value of the angular velocity sensor.

For example, if the detection reference point of the y-axis acceleration sensor 4y is positioned above the ground contact point of the rear wheel for a predetermined distance L, a detection value ay' of y-axis acceleration detected by the y-axis acceleration sensor 4y can be converted into the y-axis acceleration ay at the ground contact point of the rear wheel by the following equation (A).

$$ay = ay' + L\cdot\omega x\_dot \quad (A)$$

Note that ωx_dot is x-axis angular acceleration (differential value of x-axis angular velocity).

Hereinbelow, details of processing of the measurement processing unit 6 will be described. The measurement processing unit 6 acquires, through an A/D converter or the like, a detection signal of the vehicle speed sensor 2 and a detection signal of the inertial sensor unit 3 (detection signals of the acceleration sensors 4x, 4y and detection signals of the angular velocity sensors 5x, 5z) in predetermined arithmetic processing periods, and obtains detection values of a vehicle speed V, the x-axis acceleration ax, the y-axis acceleration ay, the x-axis angular velocity ωx, and the z-axis angular velocity ωz indicated by the detection signals.

Then, in each of the arithmetic processing periods, the measurement processing unit 6 performs processing of the roll angle velocity estimation portion 11, the correction value calculation portion 12, and the pitch angle estimation portion 13, to respectively calculate an estimated value of the roll angle velocity φdot, the correction value δ, and an estimated value of the pitch angle θ.

Furthermore, in each of the arithmetic processing periods, the measurement processing unit 6 performs processing of the roll angle estimated value calculation portion 14 to calculate an estimated value of the roll angle φ, by use of an estimated value of the roll angle velocity φdot and the correction value δ respectively calculated by the roll angle velocity estimation portion 11 and the correction value calculation portion 12.

Specific processing of the roll angle velocity estimation portion 11 will be described below. Note that in the following description, concerning detection values that the measurement processing unit 6 calculates or obtains in each of the arithmetic processing periods, a value of the current arithmetic processing period is sometimes referred to as a current value, and a value of the previous arithmetic processing period is sometimes referred to as a previous value. In this case, a previous value of an estimated value of the pitch angle θ or the like is a previous estimated value of the present invention.

The equation related to the roll angle velocity φdot (equation in the first row) of the aforementioned equation (1) is the following equation (3). The second term on the right side of the equation (3) is normally sufficiently small (≈0). Therefore, the right side of the equation (3) can be approximated to the next equation (3a).

$$\varphi dot = \omega x + \sin\varphi \cdot \tan\theta \cdot \omega y + \cos\varphi \cdot \tan\theta \cdot \omega z \quad (3)$$

$$\approx \omega x + \cos\varphi \cdot \tan\theta \cdot \omega z \quad (3a)$$

The roll angle velocity estimation portion 11 calculates an estimated value of the roll angle velocity φdot by using the equation (3a) as the basic equation.

Specifically, in each of the arithmetic processing periods, the roll angle velocity estimation portion 11 obtains a detection value ωx_sens (current value) of the x-axis angular velocity ωx as well as a detection value ωz_sens (current value) of the z-axis angular velocity ωz based on detection signals of the inertial sensor unit 3, and an estimated value of the roll angle φ (previous value φ_pre) and an estimated value of the pitch angle θ (previous value θ_pre) respectively calculated by the roll angle estimated value calculation portion 14 and the pitch angle estimation portion 13 in the previous arithmetic processing period.

Then, an estimated value of the roll angle velocity φ is calculated by performing the arithmetic operation on the right side of the equation (3a), by using these values of ωx_sens, ωz_sens, φ_pre, θ_pre as values of ωx, ωz, φ, θ of the equation (3a), respectively.

Note that in this case, filtering values, which are obtained by eliminating a noise component on the high-frequency side from the detection values ωx_sens, ωz_sens by use of a low-pass filter, may be used as the values ωx and ωz, respectively, in the arithmetic operation on the right side of the equation (3a).

Next, specific processing of the pitch angle estimation portion 13 will be described below.

The equation related to the x-axis acceleration ax (equation in the first row) of the aforementioned equation (2) is the following equation (4). The next equation (4a) can be obtained from this equation (4).

$$ax = Ax \cdot \cos\theta - g \cdot \sin\theta \quad (4)$$

$$\theta = \sin^{-1}((Ax \cdot \cos\theta - ax)/g) \quad (4a)$$

Additionally, since Ax is acceleration in the X-axis direction of the vehicle body 101 described above in the global coordinate system, it is equivalent to a time rate of change of vehicle speed V, which is the movement speed of the vehicle body 101 in the X-axis direction, Vdot (=dV/dt) as shown in the following equation (5).

$$Ax = Vdot \quad (5)$$

By applying this equation (5) to the aforementioned equation (4a), the following equation (4b) can be obtained.

$$\theta = \sin^{-1}((Vdot \cdot \cos\theta - ax)/g) \quad (4b)$$

Basically, the pitch angle θ of the vehicle body 101 can be estimated on the basis of this equation (4b). In this case, the time rate of change (the time rate of change between the current value and the previous value) of a detection value V_sens of the vehicle speed V based on a detection signal of the vehicle speed sensor 2, an estimated value of the pitch angle θ (previous value θ_pre) calculated by the pitch angle estimation portion 13 in the previous arithmetic processing period, and a detection value ax_sens (current value) of the x-axis acceleration ax based on a detection signal of the inertial sensor unit 3 may be used as the values of Vdot, θ, and ax, respectively, on the right side of the equation (4b).

However, the detection value ax_sens generally includes the x-axis acceleration error component ax_ofsterr, which is a steady-state error component resulting from drift in the output of the x-axis acceleration sensor 4x and the like.

Hence, in the embodiment, the pitch angle estimation portion 13 calculates an estimated value of the pitch angle θ on the basis of the following equation (4c), in which a value obtained by eliminating ax_ofsterr from ax_sens (=ax_sens−ax_ofsterr) is used as the value of ax of the equation (4b).

$$\theta = \sin^{-1}((Vdot \cdot \cos\theta - ax\_sens - ax\_ofsterr)/g) \quad (4c)$$

Figure 4:
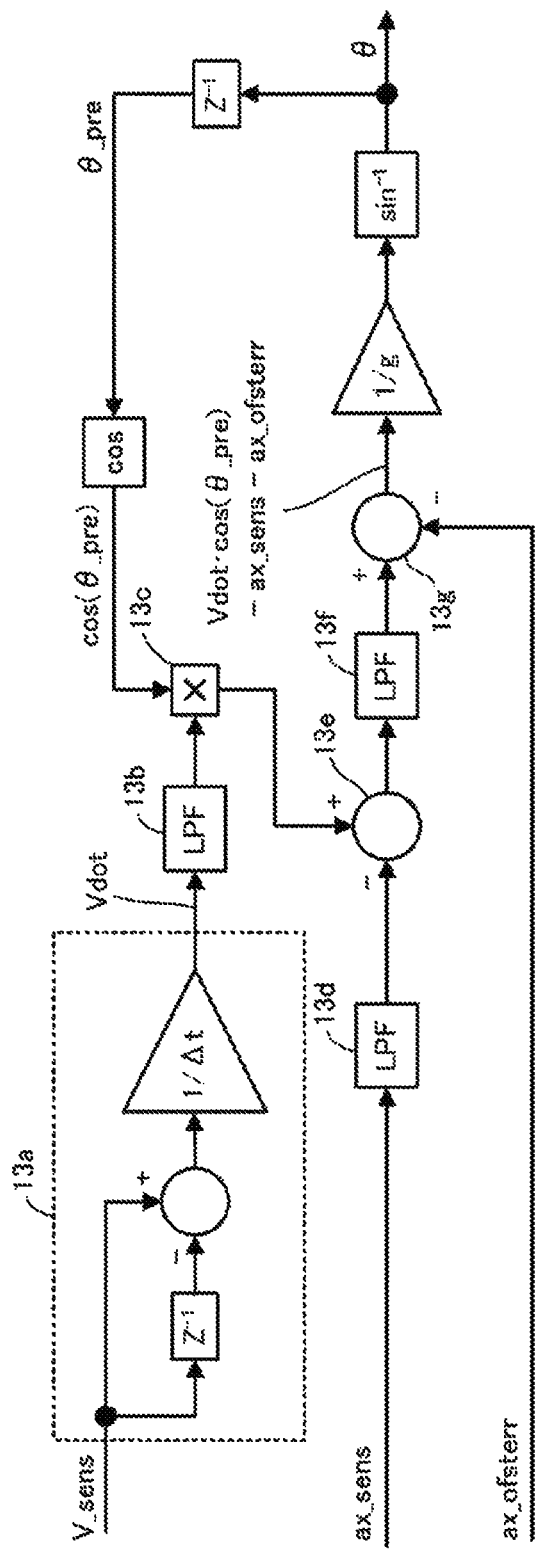
FIG. 4 is a block diagram showing processing of a pitch angle estimation portion shown in FIG. 3.

Specifically, the pitch angle estimation portion 13 calculates an estimated value of the pitch angle θ according to the processing shown in the block diagram of FIG. 4.

That is, in each of the arithmetic processing periods, the pitch angle estimation portion 13 obtains the detection value V_sens of the vehicle speed V based on a detection signal of the vehicle speed sensor 2, the detection value ax_sens of the x-axis acceleration ax based on a detection signal of the inertial sensor unit 3, and an estimated value of the x-axis acceleration error component ax_ofsterr calculated by the x-axis acceleration error component estimation portion 16.

Then, the pitch angle estimation portion 13 performs processing for calculating the time rate change Vdot of the detection value V_sens of the vehicle speed V, in a differential operation portion 13a.

In the differential operation portion 13a, the time rate of change Vdot of V_sens is calculated by dividing a difference between the current value and previous value of V_sens by a time interval Δt of the arithmetic processing period, in each of the arithmetic processing periods. Note that "Z$^{-1}$" in the drawings indicates a delay element in a discrete system.

Then, the pitch angle estimation portion 13 performs processing in an operation portion 13c to multiply a filtering value (output value of a filter 13b), which is obtained by eliminating a noise component on the high-frequency side by use of the low-pass filter 13b from Vdot calculated in the differential operation portion 13a, by a cosine function value cos (θ_pre) of the previous value θ_pre of an estimated value of the pitch angle θ.

In addition, the pitch angle estimation portion 13 performs processing in an operation portion 13e to subtract a filtering value (output value of a filter 13d), which is obtained by eliminating a noise component on the high-frequency side by use of the low-pass filter 13d from the detection value ax_sens of the x-axis acceleration ax, from an output value of the operation portion 13c.

Thereafter, the pitch angle estimation portion 13 performs processing in an operation portion 13g to subtract an estimated value of the x-axis acceleration error component ax_ofsterr calculated by the x-axis acceleration error component estimation portion 16 (to be described later in detail), from a filtering value (output value of a filter 13f) obtained by eliminating a noise component on the high-frequency side by use of the low-pass filter 13f from an output value of the operation portion 13e. The processing in the operation portion 13g is the processing for eliminating an estimated value of the x-axis acceleration error component ax_ofsterr from ax_sens.

Note that the filter 13f may be omitted. However, the embodiment includes the filter 13f to minimize the influence of noise.

The value of (Vdot·cos θ−ax_sens−ax_ofsterr) in the equation (4c) is calculated by the operation up to the processing of the operation portion 13g. Note that in this case, (Vdot·cos θax_sens) is the filtering value after elimination of the noise component on the high-frequency side by the low-pass filters 13b, 13d, 13f.

Then, according to the equation (4c), the pitch angle estimation portion 13 calculates an inverse sine value of a value obtained by dividing an output value of the operation portion 13g by the standard gravity g, as an estimated value of the pitch angle θ.

In the embodiment, an estimated value of the pitch angle θ of the vehicle body 101 is successively calculated by performing the processing of the pitch angle estimation portion 13 in the above-mentioned manner.

Note that the values of Vdot, ax_sens, and ax_ofsterr used in the arithmetic processing of the pitch angle estimation portion 13 may be relative proportions with respect to the standard gravity g (acceleration values expressed in units of g). In this case, the processing of dividing the output value of the operation portion 13g by the standard gravity g is unnecessary.

Next, specific processing of the correction value calculation portion 12 will be described below. Basically, the roll angle φ of the vehicle body 101 can be estimated by integrating an estimated value of the roll angle velocity φdot calculated by the roll angle velocity estimation portion 11. However, in such a case, error included in the estimated value of the roll angle velocity φdot is accumulated by integration, and therefore may lead to divergence in an estimated value of the roll angle φ.

The correction value calculation portion 12 is configured to calculate the correction value δ for preventing such accumulation of error.

Firstly, focusing on the equation related to the y-axis acceleration ay (equation in the second row) as an equation including the value of the roll angle φ in the aforementioned equation (2), this equation is the following equation (6). Since the first term on the right side of this equation (6) is normally sufficiently small (≈0), the right side of the equation (6) can be approximated to the next equation (6a).

$$ay = \sin\varphi \cdot \sin\theta \cdot Ax + \cos\varphi \cdot Ay + \sin\varphi \cdot \cos\theta \cdot g \quad (6)$$

$$\approx \cos\varphi \cdot Ay + \sin\varphi \cdot \cos\theta \cdot g \quad (6a)$$

And since sideslip of the vehicle body 101 can normally be considered as being sufficiently small, Ay, as acceleration in the Y-axis direction of the vehicle body 101 described above in the global coordinate system, can be considered equivalent to acceleration in the Y-axis direction due to centrifugal force (=ψdot·V), as in the following equation (7).

$$Ay=\psi dot \cdot V \quad (7)$$

Furthermore, the equation related to the yaw angle velocity ψdot (equation in the third row) of the aforementioned equation (1) is the following equation (8). According to various experiments carried out by the inventors of the present application, the right side of this equation (8) can virtually be approximated to the following equation (8a).

$$\psi dot = (\sin\varphi/\cos\theta) \cdot \omega y + (\cos\varphi/\cos\theta) \cdot \omega z \quad (8)$$

$$\approx (1/\cos\theta) \cdot \omega z \quad (8a)$$

By applying the above equations (7) and (8a) to the equation (6a), the following equation (6b) can be obtained.

$$ay \approx \cos\varphi \cdot (1/\cos\theta) \cdot \omega z \cdot V + \sin\varphi \cdot \cos\theta \cdot g \quad (6b)$$

Here, the value of the y-axis acceleration ay can be estimated by the equation (6b), by using a detection value of the vehicle speed V based on a detection signal of the vehicle speed sensor 2, a detection value of the z-axis angular velocity ωz based on a detection signal of the inertial sensor unit 3, an estimated value of the pitch angle θ, and an estimated value of the roll angle φ. In this case, an estimated value of the y-axis acceleration ay (hereinafter assigned the reference numeral ay_estm) based on the equation (6b) is affected by error in an estimated value of the roll angle φ.

Meanwhile, the value of the y-axis acceleration ay is detected by the inertial sensor unit 3. Accordingly, the deviation between a detection value of ay ay_sens based on a detection signal of the inertial sensor unit 3 and an estimated value of ay ay_estm based on the equation (6b) (=ay_sens−ay_estm) corresponds to error in an estimated value of the roll angle φ.

Hence, basically, the correction value δ that can appropriately eliminate error in an estimated value of the roll angle φ can be obtained, by determining the correction value δ as a feedback operation amount for bringing the deviation (ay_sens−ay_estm) as close as possible to zero by a feedback control law.

However, the detection value ay_sens of the y-axis acceleration ay generally includes the y-axis acceleration error component ay_ofsterr, which is a steady-state error component resulting from drift in the output of the y-axis acceleration sensor 4y and the like.

Hence, in the embodiment, the correction value calculation portion 12 calculates the correction value δ, in such a manner as to bring the deviation between a value, which is obtained by eliminating ay_ofsterr from ay_sens (=ay_sens−ay_ofsterr), and an estimated value ay_estm of ay based on the equation (6b) (=(ay_sens−ay_ofsterr)−ay_estm) as close as possible to zero by a feedback control law.

More specifically, in each of the arithmetic processing periods, the correction value calculation portion 12 obtains the detection value V_sens (current value) of the vehicle speed V based on a detection signal of the vehicle speed sensor 2, the detection value ωz_sens (current value) of the z-axis angular velocity ωz as well as the detection value ay_sens (current value) of the y-axis acceleration ay based on detection signals of the inertial sensor unit 3, the previous value θ_pre of an estimated value of the pitch angle θ estimated by the pitch angle estimation portion 13, and the previous value φ_pre of an estimated value of the roll angle φ estimated by the roll angle estimated value calculation portion 14.

Then, an estimated value ay_estm of the y-axis acceleration ay is calculated by performing the arithmetic operation on the right side of the equation (6b), by using the values of V_sens, ωz_sens, θ_pre, φ_pre as values of V, ωz, θ, φ of the equation (6b), respectively.

Note that in this case, filtering values, which are obtained by eliminating a noise component on the high-frequency side from the detection values V_sens and ωz_sens by use of a low-pass filter, may be used as the values V and ωz, respectively, in the arithmetic operation on the right side of the equation (6b).

Then, the correction value calculation portion 12 calculates the correction value δ by the following equation (9), by using the current value of the detection value ay_sens of the y-axis acceleration ay (or a filtering value obtained by eliminating a noise component on the high-frequency side from ay_sens by use of a low-pass filter), and an estimated value of the y-axis acceleration error component ay_ofsterr estimated by the y-axis acceleration error component estimation portion 15 (to be described later in detail).

$$\delta = k1 \cdot ((ay\_sens - ay\_ofsterr) - ay\_estm) + k2 \cdot \int ((ay\_sens - ay\_ofsterr) - ay\_estm) dt \quad (9)$$

Note that k1 and k2 of the equation (9) are predetermined gain values.

Accordingly, in the embodiment, the correction value calculation portion 12 calculates the correction value δ in such a manner as to bring, as close as possible to zero by the PI control law (proportional-integral controller) which is one of feedback control laws, the deviation between a value, which is obtained by eliminating an estimated value of the y-axis acceleration error component ay_ofsterr from the detection value ay_sens of ay, and an estimated value ay_estm of ay based on the equation (6b) (=ay_sens−ay_ofsterr−ay_estm).

Note that the integration in the equation (9) is an integration operation of discretized values. The same goes with the other integrations in the embodiment.

In the embodiment, the correction value δ is successively calculated by performing the processing of the correction value calculation portion 12 in the above-mentioned manner.

Next, specific processing of the roll angle estimated value calculation portion 14 will be described below. In the embodiment, in each of the arithmetic processing periods, the roll angle estimated value calculation portion 14 calculates an estimated value of the roll angle φ by integrating a value obtained by correcting an estimated value (current value) of the roll angle velocity φdot calculated by the roll angle velocity estimation portion 11 by use of the correction value δ (current value) calculated by the correction value calculation portion 12 (=φdot−δ), as shown in FIG. 3.

In this case, since the correction value δ is calculated in the aforementioned manner, the estimated value of the roll angle φ is calculated so as to reduce error in the estimated value.

Next, processing of the y-axis acceleration error component estimation portion 15 and the x-axis acceleration error component estimation portion 16, which were to be mentioned later, will be described. Firstly, processing of the y-axis acceleration error component estimation portion 15 will be described.

In a forward-traveling state of the motorcycle 100 (i.e., forward-traveling state of the vehicle body 101), the actual value of the y-axis acceleration ay is considered to be equivalent to or almost equivalent to zero. Accordingly, if the detection value ay_sens of the y-axis acceleration ay based on a detection signal of the inertial sensor unit 3 in a forward-traveling state of the motorcycle 100 is not zero, the detection value ay_sens is considered to be the y-axis acceleration error component ay_ofsterr as the steady-state error component.

Hence, in the embodiment, the y-axis acceleration error component estimation portion 15 determines whether or not the motorcycle 100 (vehicle body 101) is in a forward-traveling state, and estimates the y-axis acceleration error component ay_ofsterr on the basis of the detection value ay_sens of the y-axis acceleration ay in a state where it is determined that the vehicle is in a forward-traveling state.

More specifically, in each of the arithmetic processing periods, the y-axis acceleration error component estimation portion 15 obtains the detection value V_sens (current value) of the vehicle speed V based on a detection signal of the vehicle speed sensor 2, and the detection value ωz_sens (current value) of the z-axis angular velocity ωz as well as the detection value ay_sens (current value) of the y-axis acceleration ay based on detection signals of the inertial sensor unit 3.

Then, the y-axis acceleration error component estimation portion 15 determines whether or not the motorcycle 100 is in a forward-traveling state, on the basis of the current value of V_sens (or a filtering value obtained by eliminating a noise component on the high-frequency side from V_sens by use of a low-pass filter), and the current value of ωz_sens (or a filtering value obtained by eliminating a noise component on the high-frequency side from ωz_sens by use of a low-pass filter).

Specifically, the y-axis acceleration error component estimation portion 15 determines that the motorcycle 100 is in a forward-traveling state if the following conditions are satisfied: V_sens is a vehicle speed of not lower than a predetermined speed; and a product of ωz_sens equivalent to acceleration in the y-axis direction due to centrifugal force and V_sens (=ωz_sens·V_sens) is not larger than a predetermined value.

On the other hand, if the conditions are not satisfied, the y-axis acceleration error component estimation portion 15 determines that the motorcycle 100 is not in a forward-traveling state.

Thus, the processing of determining whether or not the motorcycle is in a forward-traveling state implements forward travel determination device of the present invention.

Here, the predetermined speed concerning V_sens mentioned above is a vehicle speed slightly higher than zero. Also, the predetermined value concerning ωz_sens·V_sens mentioned above is also slightly larger than zero. Accordingly, it is determined that the motorcycle 100 is in a forward-traveling state when the vehicle speed V is not zero or a vehicle speed close to zero, and when the centrifugal force can be considered to be sufficiently small.

Meanwhile, it is determined that the motorcycle 100 is not in a forward-traveling state when the motorcycle is in a stopped or a similar state, or in the course of a turning motion.

Then, when it is determined that the motorcycle 100 is in a forward-traveling state, the y-axis acceleration error component estimation portion 15 filters the detection value ay_sens of the y-axis acceleration ay with a low-pass filter to extract the direct-current component of the detection value ay_sens as the y-axis acceleration error component ay_ofsterr.

Accordingly, when it is determined that the motorcycle 100 is in a forward-traveling state, an output value of the low-pass filter receiving input of ay_sens is obtained as an estimated value of the y-axis acceleration error component ay_ofsterr in each of the arithmetic processing periods. Then, this estimated value is used in the arithmetic processing of the correction value calculation portion 12.

When the state where it is determined that the motorcycle 100 is in the forward-traveling state is switched to a state where it is determined that the motorcycle is not in the forward-traveling state, an estimated value of the y-axis acceleration error component ay_ofsterr and the internal state quantity of the filter are retained until it is next determined that the motorcycle is in a forward-traveling state. Then, when it is determined that the motorcycle 100 is not in the forward-traveling state, the y-axis acceleration error component estimation portion 15 feeds the retained estimated value of ay_ofsterr to the correction value calculation portion 12.

Processing of the y-axis acceleration error component estimation portion 15 is performed as described above.

Next, processing of the x-axis acceleration error component estimation portion 16 will be described. When a steady-state error component (x-axis acceleration error component ax_ofsterr) is included in the detection value ax_sens of the x-axis acceleration ax based on a detection signal of the inertial sensor unit 3, the steady-state error component affects an estimated value of the pitch angle θ, as can be understood from the aforementioned equation (4a).

Moreover, when error induced by the steady-state error component occurs in an estimated value of the pitch angle θ, an estimated value of the roll angle velocity φdot is affected except for a case where the z-axis angular velocity ωz is zero, as can be understood from the aforementioned equation (3a).

Thus, error in the detection value ax_sens of the x-axis acceleration ax affects an estimated value of the roll angle velocity φdot (therefore, an estimated value of the roll angle φ) except for the case where the z-axis angular velocity ωz is zero, i.e., during turning of the motorcycle 100 (during a turning motion of the vehicle body 101). A larger value of ωz causes a larger influence.

Hence, the y-axis acceleration ay that mainly occurs during turning of the motorcycle 100 is focused. The following equation (10) can be obtained from the equation (6a), which is an approximation of the equation (2) with respect to ay.

$$ay - \cos\phi \cdot Ay = \sin\phi \cdot \cos\theta \cdot g \quad (10)$$

When the roll angle φ is relatively small, although cos φ on the left side of the equation (10) is less likely to be affected by the error in the value of φ, sin φ on the right side is likely to be affected by the error in the value of φ. Also, the y-axis acceleration ay is basically acceleration that occurs during turning of the motorcycle 100.

Accordingly, when an error occurs in an estimated value of the roll angle φ under the influence of the steady-state error component (x-axis acceleration error component ax_ofsterr) included in the detection value ax_sens of the x-axis acceleration ax, a relatively prominent difference is considered to be caused in the value on the right side and on the left side of the equation (10) in a state where the roll angle φ is relatively small, immediately after the start of turning of the motorcycle 100.

In addition, when the time rate of change (differential value) on the right side and on the left side of the equation (10) is focused, the time rate of change is less likely to be affected by the y-axis acceleration error component ay_ofsterr and the like.

Hence, in the embodiment, the x-axis acceleration error component estimation portion 16 obtains the deviation between the time rate of change (sin φ·cos θ·g)_dot on the right side of the equation (10) and the time rate of change (ay−cos φ·Ay)_dot on the left side thereof, i.e., ofsterr expressed by the following equation (11), as a basic index value for estimating the x-axis acceleration error component ax_ofsterr.

$$\text{ofsterr} = (\sin\phi \cdot \cos\theta \cdot g)\_dot - (ay - \cos\phi \cdot Ay)\_dot \quad (11)$$

Here, (sin φ·cos θ·g)_dot on the right side of the equation (11) can be approximated by the following equation (12).

$$(\sin\phi \cdot \cos\theta \cdot g)\_dot \approx \theta dot \cdot \cos\phi \cdot \cos\theta \cdot g \quad (12)$$

In addition, (ay−cos φ·Ay)_dot on the right side of the equation (11) is substantially equivalent to a pseudo differential value of a value obtained by approximately subtracting an estimated value of cos φ·Ay from the detection value ay_sens of ay (value obtained by filtering the differential value of (ay_sens−cos φ·Ay) with a low-pass filter).

Accordingly, the basic index value ofsterr can be calculated from estimated values of φdot, φ, and θ and the pseudo differential value of (ay_sens−cos φ·Ay).

In this case, since Ay=(1/cos θ)·ωz·V can be obtained from the aforementioned equations (7) and (8a), the value of (ay_sens−cos φ·Ay) can be calculated from the detection value ay_sens of ay, an estimated value φ_pre of φ, an estimated value θ_pre of θ, the detection value ωz_sens of ωz, and the detection value V_sens of V.

Then, the x-axis acceleration error component estimation portion 16 calculates the x-axis acceleration error component ax_ofsterr by performing an integration operation of the following equation (13) during a predetermined time period immediately after the start of a turning motion of the motorcycle 100 (turning motion of the vehicle body 101), by using values of the basic index value ofsterr and the z-axis angular velocity ωz.

$$ax\_ofsterr = k3 \cdot (\int (ofsterr \cdot \omega z \cdot C) dt) \quad (13)$$

k3 in the above equation (13) is a gain of a predetermined value, and C is a coefficient set in accordance with the value of the z-axis angular velocity ωz and its time rate of change. In this case, a variable component (component from which the low-frequency component is eliminated) of ofsterr according to the turning motion of the vehicle body 101 is used as the value of ofsterr in the integration operation of the equation (13). Similarly, a variable component (component from which the low-frequency component is eliminated) of the detection value ωz_sens of ωz according to the turning motion of the vehicle body 101 is used as the value of ωz. Note that (ofsterr·ωz) in the equation (13) is an error index value of the present invention.

Figure 5:
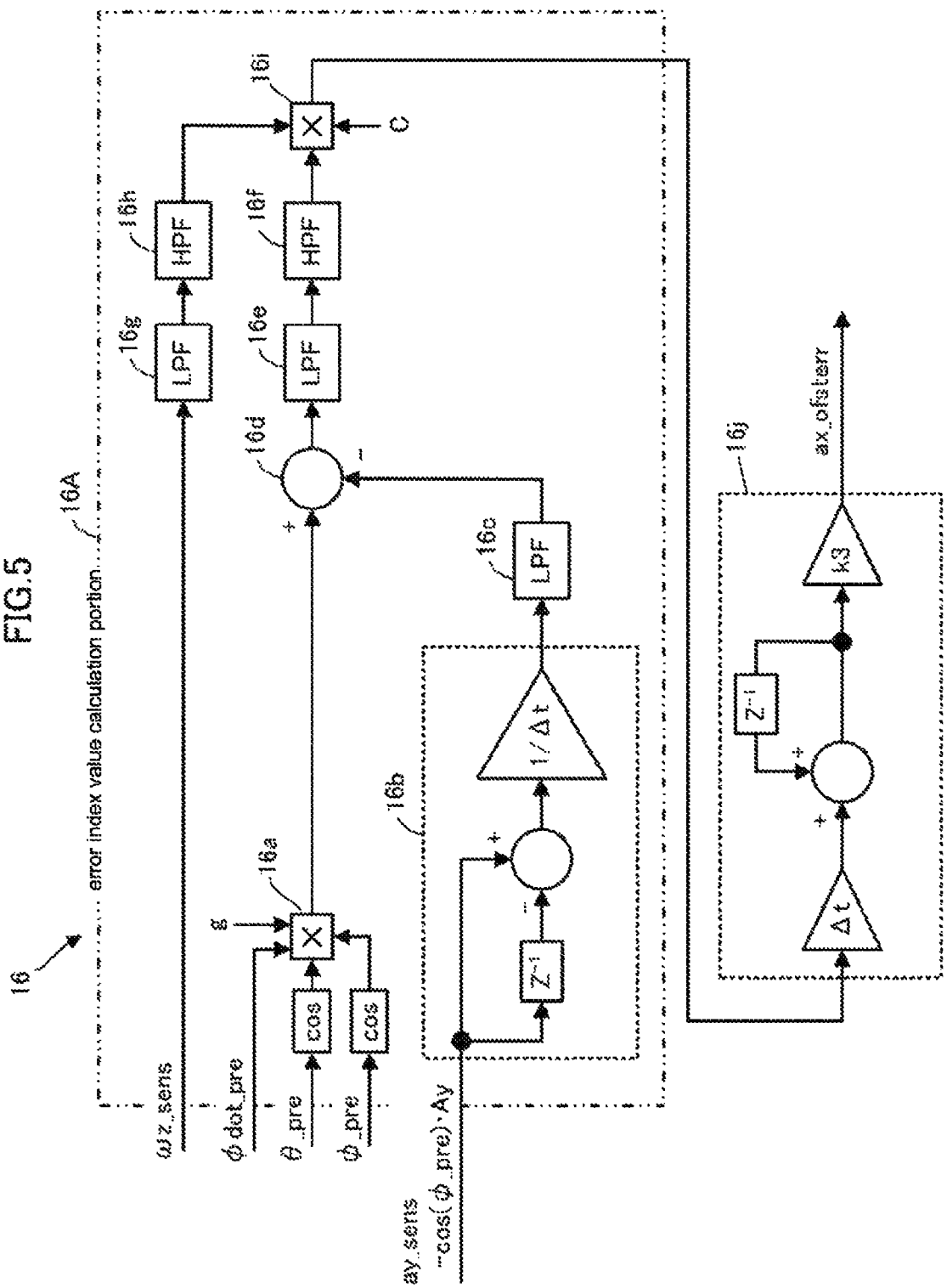
FIG. 5 is a block diagram showing processing of an x-axis acceleration error component estimation portion shown in FIG. 3.
Figure 6:
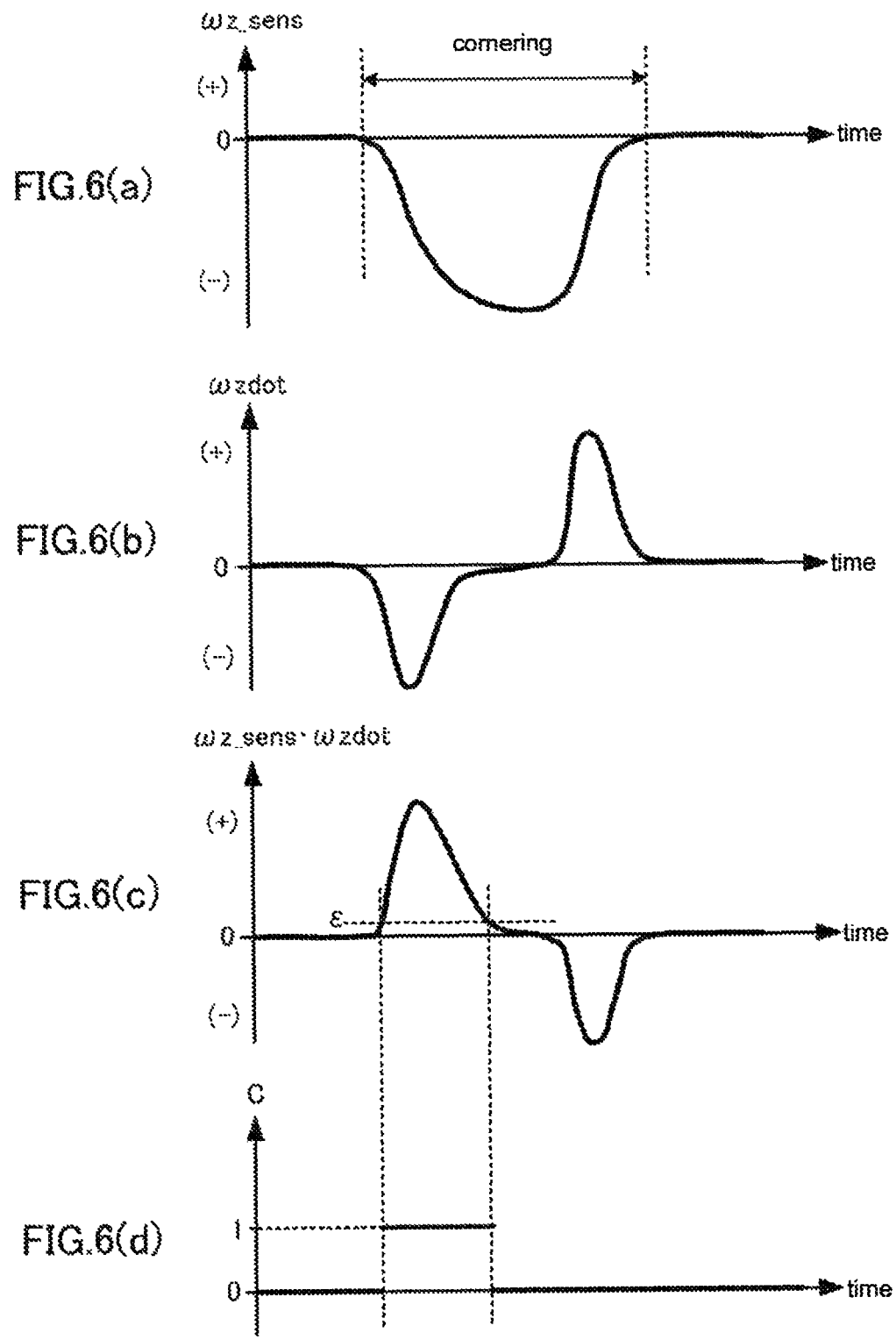
FIGS. 6(a) to 6(d) are graphs for describing processing of the x-axis acceleration error component estimation portion in FIG. 5.

More specifically, the x-axis acceleration error component estimation portion 16 calculates the x-axis acceleration error component ax_ofsterr by performing the processing shown in the block diagram of FIG. 5.

In each of the arithmetic processing periods, the x-axis acceleration error component estimation portion 16 obtains the detection value ωz_sens (current value) of the z-axis angular velocity ωz as well as the detection value ay_sens (current value) of the y-axis acceleration ay based on detection signals of the inertial sensor unit 3, an estimated value (previous value φdot_pre) of the roll angle velocity φdot estimated by the roll angle velocity estimation portion 11, an estimated value (previous value φ_pre) of the roll angle θ calculated by the roll angle estimated value calculation portion 14, and an estimated value (previous value θ_pre) of the pitch angle θ estimated by the pitch angle estimation portion 13.

Then, the x-axis acceleration error component estimation portion 16 performs processing in an operation portion 16a to calculate the product of a cosine function value of θ_pre, a cosine function value of φ_pre, φdot_pre, and the standard gravity g. This processing is equivalent to processing of calculating the first term of the equation (11) by the approximation (12). Hence, the processing is, in other words, processing for calculating the time rate of change of y-axis acceleration estimated from an estimated value (previous value φdot_pre) of the roll angle velocity φdot, an estimated value (previous value θ_pre) of the pitch angle θ, and an estimated value (previous value φ_pre) of the roll angle φ, which were calculated in the previous arithmetic processing period (=(sin φ·cos θ·g)_dot).

Also, the x-axis acceleration error component estimation portion 16 performs processing in a differential operation portion 16b to calculate the time rate of change (differential value) of the detection value ay_sens of the y-axis acceleration ay, an estimated value (previous value φ_pre) of the roll angle φ, and the value of (ay_sens−cos φ·Ay), and then filters the calculated time rate of change with a low-pass filter 16c, to thereby calculate the pseudo differential value of ay_sens. This processing is equivalent to processing for calculating the second term on the right side of the equation (11).

In this case, the value of (ay_sens−cos φ·Ay) in each of the arithmetic processing periods is calculated by a relational expression Ay=(1/cos θ)·ωz·V by using the detection value ay_sens of the y-axis acceleration ay, an estimated value (previous value φ_pre) of the roll angle φ, an estimated value (previous value θ_pre) of the pitch angle θ, the detection value ωz_sens of the z-axis angular velocity ωz, and the detection value V_sens of the vehicle speed V.

Then, the x-axis acceleration error component estimation portion 16 performs processing in an operation portion 16d to calculate the deviation between an output value of the operation portion 16a and an output value of the filter 16c. Thus, the basic index value ofsterr is obtained.

Moreover, the x-axis acceleration error component estimation portion 16 eliminates a frequency component resulting from vibration of the engine of the motorcycle 100, for example, from the basic index value ofsterr by use of a low-pass filter 16e, and then extracts a variable component (variable component from which a steady-state component not higher than a predetermined frequency is eliminated) of ofsterr by use of a high-pass filter 16f. An output value of the filter 16f is equivalent to a variable component of ofsterr generated in accordance with the turning motion of the motorcycle 100 (vehicle body 101).

Additionally, the x-axis acceleration error component estimation portion 16 eliminates the frequency component resulting from vibration of the engine of the motorcycle 100, for example, from ωz_sens by use of a low-pass filter 16g, and then extracts a variable component (variable component from which a steady-state component not higher than a predetermined frequency is eliminated) of ωz_sens by use of a high-pass filter 16h. An output value of the filter 16h is equivalent to a variable component of ωz_sens generated in accordance with the turning motion of the motorcycle 100 (vehicle body 101).

Then, the x-axis acceleration error component estimation portion 16 performs processing in an arithmetic operation portion 16i to calculate a value obtained by multiplying the output value of the filter 16f by the output value of the filter 16h and the coefficient C. Thus, the value of (ofsterr·ωz·C) for performing the integration of the equation (13) is obtained.

In this case, the coefficient C in the embodiment is determined by the following equation (14a) or (14b), depending on whether or not the value of a product of ωz_sens and its angular acceleration ωzdot, which is the time rate of change thereof, (=ωz_sens·ωzdot) is equal to zero or is not less than a predetermined value ε previously set to a positive value slightly larger than zero. Note that ωzdot is calculated as a value obtained by dividing a difference between the current and previous values of ωz_sens by a time interval Δt of the arithmetic processing period in each of the arithmetic processing periods, or a filtering value obtained by filtering this value with a low-pass filter.

$$\text{If } \omega z\_sens \cdot \omega zdot \geq \epsilon, \ C=1 \tag{14a}$$

$$\text{If } \omega z\_sens \cdot \omega zdot < \epsilon, \ C=0 \tag{14b}$$

Here, when a turning motion of the motorcycle 100 (turning motion of the vehicle body 101) is performed, ωz_sens varies as exemplified in FIG. 6(a), for example. At this time, as exemplified in FIG. 6(b), the polarity of ωzdot is the same as ωz_sens in the initial period immediately after the start of the turning motion of the vehicle body 101, and the polarity is reversed from that of ωz_sens in the end period of the turning motion.

Accordingly, as exemplified in FIG. 6(c), the value of the product of ωz_sens and ωzdot is positive in the initial period immediately after the start of the turning motion of the vehicle body 101.

Hence, by determining the coefficient C with the equation (14a) or (14b) as mentioned above, the coefficient C is set to 1 when a state is considered to be immediately after the start of a turning motion of the vehicle body 101 (state where ωz_sens·ωzdot≥ε), and the coefficient C is set to zero in other states, as shown in FIG. 6(d).

Accordingly, the output value of the arithmetic operation portion 16i is always zero regardless of the output values of the filters 16f, 16h, in states other than the state considered to be immediately after the start of a turning motion of the vehicle body 101.

Thereafter, the x-axis acceleration error component estimation portion 16 performs processing in an integration operation portion 16j to integrate (or accumulate) the output value of the arithmetic operation portion 16i, and multiply the integrated value by a gain value k3. This processing is the arithmetic processing on the right side of the equation (13). Thus, the x-axis acceleration error component ax_ofsterr is obtained.

In this case, since the coefficient C is set as described above, the integration processing of the integration operation portion 16*j* is virtually performed in the period where ωz_sens·ωzdot≥ϵ, i.e., only in the period when it can be considered as immediately after the start of a turning motion of the vehicle body 101. Therefore, the calculation and renewal processing of the x-axis acceleration error component ax_ofsterr is virtually performed only in the period when it can be considered as immediately after the start of a turning motion of the vehicle body 101.

In the period where ωz_sens·ωzdot<ϵ, the value of the x-axis acceleration error component ax_ofsterr is kept constant.

Processing of the x-axis acceleration error component estimation portion 16 is performed as described above. That is, if an estimated value of the x-axis acceleration error component ax_ofsterr is equal to the true value of the x-axis acceleration error component ax_ofsterr, the basic index value ofsterr is considered to be zero. Hence, in this processing, an estimated value of the x-axis acceleration error component ax_ofsterr is gradually altered such that the basic index value ofsterr, and therefore an error index value (ofsterr·ωz) is brought closer to zero. Then, an estimated value of ax_ofsterr calculated in this processing is used in the arithmetic processing of the pitch angle estimation portion 13.

Incidentally, in the embodiment, an error index value calculation portion assigned the reference numeral 16A in FIG. 5 is error index value calculator of the present invention. Also, the output of the arithmetic operation portion 16*i* is an error index value of the present invention.

Additionally, the filters 16*e*, 16*f* are first filters or filtering means of the present invention, and the filters 16*g*, 16*h* are second filters or filtering means of the present invention. Also, the output value of the filter 16*f* is a deviation variable component of the present invention, and the output value of the filter 16*h* is a z-axis angular velocity variable component of the present invention.

According to the embodiment described above, the roll angle velocity ϕ and the pitch angle θ can be accurately estimated in various states of movement of the vehicle body 101, in the roll angle velocity estimation portion 11 and the pitch angle estimation portion 13, respectively.

Since in this case the pitch angle estimation portion 13 uses an estimated value of the x-axis acceleration error component ax_ofsterr to compensate for the influence of the x-axis acceleration error component ax_ofsterr, accuracy in estimation of the pitch angle θ can be enhanced. Therefore, accuracy of the roll angle velocity estimation portion 11 in estimating the roll angle velocity ϕdot can also be enhanced.

Further, in the correction value calculation portion 12 the correction value δ is calculated in such a manner as to bring the deviation between a value, which is obtained by eliminating the y-axis acceleration error component ay_ofsterr from the detection value ay_sens of the y-axis acceleration ay, and an estimated value ay_estm of the y-axis acceleration ay as close as possible to zero by a feedback control law (PI control law in this embodiment).

Hence, a correction value suitable for reducing error in an estimated value of the roll angle ϕ in various states of movement of the vehicle body 101 can be calculated stably.

Therefore, an estimated value of the roll angle can be accurately and stably calculated according to the embodiment.

Next, some modified embodiments of the above embodiment will be described.

Figure 7:
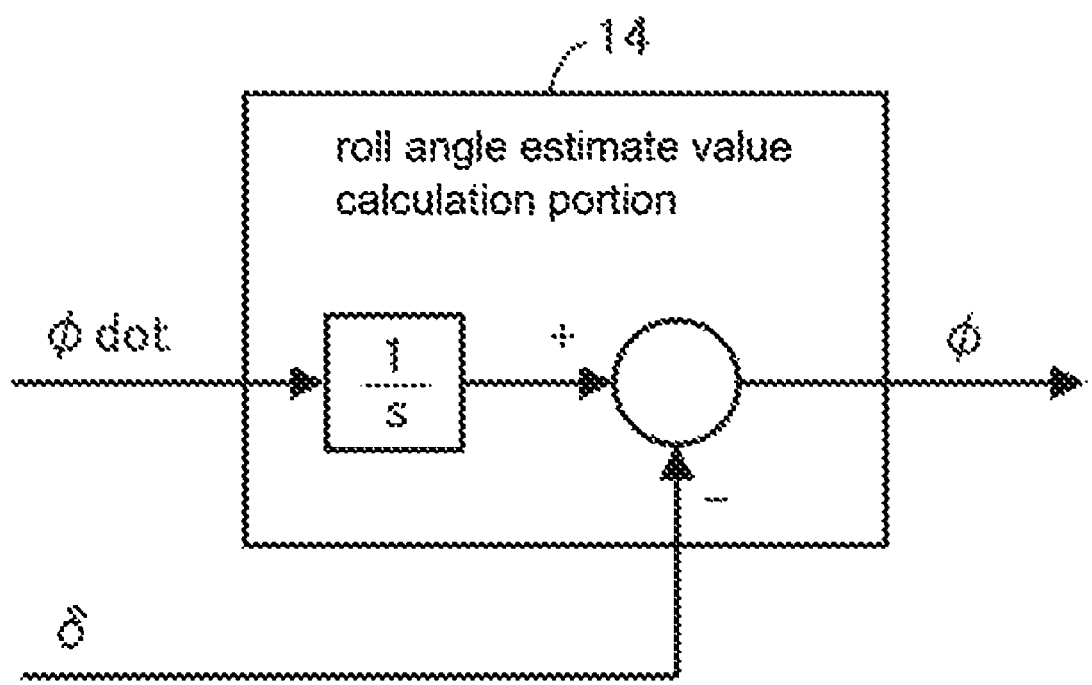
FIG. 7 is a block diagram showing processing of a roll angle estimated value calculation portion of another embodiment.

In the aforementioned embodiment, the roll angle estimated value calculation portion 14 corrects an estimated value of the roll angle velocity ϕdot by use of the correction value δ. However, as shown in the block diagram of FIG. 7, a value obtained by integrating an estimated value of the roll angle velocity ϕdot may be corrected by the correction value δ. Even in this case, the correction value δ is calculated in such a manner as to bring the deviation between a value, which is obtained by eliminating the y-axis acceleration error component ay_ofsterr from the detection value ay_sens of the y-axis acceleration ay, and an estimated value ay_estm of the y-axis acceleration ay as close as possible to zero. Hence, consequently, an estimated value of ϕ can be calculated so as to reduce error in this estimated value.

Moreover, in the processing of the roll angle velocity estimation portion 11, the correction value calculation portion 12, the pitch angle estimation portion 13, the y-axis acceleration error component estimation portion 15, and the x-axis acceleration error component estimation portion 16, the value of arithmetic operation result may be obtained by use of map data created in advance, instead of actually performing the addition, subtraction, multiplication and division or calculation of the functions. For example, in the processing of the roll angle velocity estimation portion 11, the second term on the right side of the equation (3a) may be obtained by map data from the values ϕ, θ, and ωz.

Additionally, although the detection reference point of acceleration is set at the ground contact point of the rear wheel in the embodiment, it may be set at a different point. Note, however, that the coordinate system needs to be converted appropriately in such a case.

Also, although in the embodiment estimation of the error component is performed in the local coordinate system, it may be performed in the global coordinate system.

In addition, although in the embodiment the case of estimating the roll angle of the vehicle body 101 of the motorcycle 100 is used as an example in the description, the vehicle body to which the present invention is applied may be that of a traveling vehicle other than the motorcycle 100 (e.g., a four-wheeled automobile or a bicycle).

Additionally, the arithmetic processing of the embodiment can be subjected to equivalent transformation by use of a detection reference point different from the embodiment, or a coordinate system different from the embodiment. Such processing that can be subjected to equivalent transformation can be considered as substantially the same as the present embodiment.

Moreover, the process of arithmetic operations of the embodiment may be changed without changing the results of the arithmetic operations. Such embodiments with changed arithmetic operation processes can also be considered as substantially equivalent to the present embodiment.

Further, acceleration in the z-axis direction may be detected, and the detection value may be used to enhance accuracy in the estimated values.

DESCRIPTION OF REFERENCE SYMBOLS

1 . . . roll angle estimation device, 2 . . . vehicle speed sensor (vehicle speed detector), 3 . . . inertial sensor unit (acceleration and angular velocity detector), 4*x*, 4*y* . . . acceleration sensor, 5*x*, 5*y* . . . angular velocity sensor, 11 . . . roll angle velocity estimation portion (roll angle velocity estimator), 12 . . . correction value calculation portion (correction value calculator), 13 . . . pitch angle estimation portion (pitch angle estimator), 14 . . . roll angle estimated value calculation portion (roll angle estimated value calculator), 15 . . . y-axis acceleration error component estimation portion (y-axis acceleration error component estimator, forward travel determination device), 16 . . . x-axis acceleration error component estimation portion (x-axis acceleration error component estimator), 16A . . . error index value calculation portion (error index value calculator), 16e, 16f . . . filter (first filter), 16g, 16h . . . filter (second filter).

What is claimed is:

1. A device for successively estimating a roll angle of a vehicle body, comprising:
an acceleration and angular velocity detector including an acceleration sensor and an angular velocity sensor mounted on said vehicle body, and when an axis extending in the front-rear direction of the vehicle body, an axis extending in the vehicle width direction of the vehicle body, and an axis extending in the up-down direction of the vehicle body are respectively defined as an x axis, a y axis, and a z axis of a local coordinate system fixed to the vehicle body, configured to be capable of detecting x-axis acceleration which is acceleration in the x-axis direction, y-axis acceleration which is acceleration in the y-axis direction, x-axis angular velocity which is angular velocity about the x axis, and z-axis angular velocity which is angular velocity about the z axis;
a vehicle speed detector configured to detect a speed of said vehicle body in a traveling direction;
a pitch angle estimator configured to successively estimate a pitch angle of said vehicle body, and calculate an estimated value of the current pitch angle by use of a detection value of speed in the traveling direction detected by said vehicle speed detector, a detection value of x-axis acceleration detected by said acceleration and angular velocity detector, and a previous estimated value of said pitch angle;
a roll angle velocity estimator configured to successively estimate roll angle velocity of said vehicle body, and calculate an estimated value of the current roll angle velocity by use of detection values of x-axis angular velocity and z-axis angular velocity detected by said acceleration and angular velocity detector, a previous estimated value of said roll angle, and the previous estimated value of the pitch angle estimated by said pitch angle estimator;
a correction value calculator configured to successively calculate a correction value for estimating the roll angle of said vehicle body, and calculate said correction value by use of the detection value of speed in the traveling direction detected by said vehicle speed detector, detection values of z-axis angular velocity and y-axis acceleration detected by said acceleration and angular velocity detector, the previous estimated value of said roll angle, and the previous estimated value of the pitch angle estimated by said pitch angle estimator; and
roll angle estimated value calculator configured to calculate an estimated value of the current roll angle of said vehicle body by integrating a value obtained by correcting the estimated value of roll angle velocity estimated by said roll angle velocity estimator by use of the calculated value of the correction value calculated by said correction value calculator.

2. The roll angle estimation device according to claim 1, wherein
said correction value calculator is configured to calculate an estimated value of said y-axis acceleration by use of a detection value of speed in the traveling direction detected by said vehicle speed detector, a detection value of z-axis angular velocity detected by said acceleration and angular velocity detector, a previous estimated value of said roll angle, and a previous estimated value of the pitch angle estimated by said pitch angle estimator, and then calculate said correction value according to a deviation between a detection value of y-axis acceleration detected by said acceleration and angular velocity detector and the estimated value of said y-axis acceleration, in such a manner as to bring the deviation closer to zero by a feedback control law.

3. The roll angle estimation device according to claim 2, further comprising x-axis acceleration error component estimator configured to estimate an x-axis acceleration error component which is a steady-state error component included in a detection value of x-axis acceleration detected by said acceleration and angular velocity detector, wherein:
said pitch angle estimator is configured to include, as part of processing performed to calculate an estimated value of said pitch angle, processing for eliminating an estimated value of the x-axis acceleration error component estimated by said x-axis acceleration error component estimator from a detection value of x-axis acceleration detected by said acceleration and angular velocity detector; and
said x-axis acceleration error component estimator
includes error index value calculator for calculating an error index value, which varies according to said x-axis acceleration error component at the time of a turning motion of said vehicle body, by use of a previous estimated value of roll angle velocity estimated by said roll angle velocity estimator, a previous estimated value of the pitch angle estimated by said pitch angle estimator, a previous estimated value of the roll angle calculated by said roll angle estimated value calculator, detection values of y-axis acceleration and z-axis angular velocity detected by said acceleration and angular velocity detector, and a detection value of speed in the traveling direction detected by said vehicle speed detector, and
is configured to determine an estimated value of said x-axis acceleration error component in such a manner as to bring the error index value calculated by the error index value calculator closer to zero, during a predetermined time period immediately after start of a turning motion of said vehicle body.

4. The roll angle estimation device according to claim 2, further comprising a y-axis acceleration error component estimator configured to estimate a y-axis acceleration error component, which is a steady-state error component included in a detection value of y-axis acceleration detected by said acceleration and angular velocity detector, wherein:
said correction value calculator is configured to include, as part of processing performed to calculate said correction value, processing for eliminating an estimated value of the y-axis acceleration error component estimated by said y-axis acceleration error component estimator from a detection value of y-axis acceleration detected by said acceleration and angular velocity detector; and
said y-axis acceleration error component estimator includes a forward travel determination device for determining whether or not said vehicle body is in a forward-traveling state, and is configured to obtain an estimated value of said y-axis acceleration error component on the basis of a detection value of y-axis acceleration detected by said acceleration and angular velocity detector, in a state where it is determined by the forward travel determination device that said vehicle body is in a forward-traveling state.

5. The roll angle estimation device according to claim 1, further comprising x-axis acceleration error component estimator configured to estimate an x-axis acceleration error component which is a steady-state error component included in a detection value of x-axis acceleration detected by said acceleration and angular velocity detector, wherein:

said pitch angle estimator is configured to include, as part of processing performed to calculate an estimated value of said pitch angle, processing for eliminating an estimated value of the x-axis acceleration error component estimated by said x-axis acceleration error component estimator from a detection value of x-axis acceleration detected by said acceleration and angular velocity detector; and said x-axis acceleration error component estimator
includes error index value calculator for calculating an error index value, which varies according to said x-axis acceleration error component at the time of a turning motion of said vehicle body, by use of a previous estimated value of roll angle velocity estimated by said roll angle velocity estimator, a previous estimated value of the pitch angle estimated by said pitch angle estimator, a previous estimated value of the roll angle calculated by said roll angle estimated value calculator, detection values of y-axis acceleration and z-axis angular velocity detected by said acceleration and angular velocity detector, and a detection value of speed in the traveling direction detected by said vehicle speed detector, and is configured to determine an estimated value of said x-axis acceleration error component in such a manner as to bring the error index value calculated by the error index value calculator closer to zero, during a predetermined time period immediately after start of a turning motion of said vehicle body.

6. The roll angle estimation device according to claim 5, wherein
said x-axis acceleration error component estimator is configured to calculate, as an estimated value of said x-axis acceleration error component, a value obtained by integrating said error index value during a predetermined time period immediately after start of a turning motion of said vehicle body.

7. The roll angle estimation device according to claim 5, wherein
said error index value calculator includes
a first filter for extracting a deviation variable component, which is a component that varies according to a turning motion of said vehicle body, from a deviation between the time rate of change of y-axis acceleration calculated from a previous estimated value of roll angle velocity estimated by said roll angle velocity estimator, a previous estimated value of the pitch angle estimated by said pitch angle estimator, and a previous estimated value of the roll angle calculated by said roll angle estimated value calculator, and the time rate of change of y-axis acceleration calculated from detection values of said y-axis acceleration and z-axis angular acceleration detected by said acceleration and angular velocity detector, a previous estimated value of roll angle velocity estimated by said roll angle velocity estimator, a previous estimated value of the pitch angle estimated by said pitch angle estimator, and a detection value of speed in the traveling direction detected by said vehicle speed detector, as well as
a second filter for extracting a z-axis angular velocity variable component, which is a component that varies according to a turning motion of said vehicle, from a detection value of z-axis angular velocity detected by said acceleration and angular velocity detector, and
is configured to calculate, as said error index value, a value obtained by multiplying the deviation variable component extracted by said first filter by the z-axis angular velocity variable component extracted by said second filter.

8. The roll angle estimation device according to claim 5, wherein
a predetermined time period immediately after start of a turning motion of said vehicle body is a time period in which a product of a detection value of z-axis angular velocity detected by said acceleration and angular velocity detector and the time rate of change of the detection value is a positive value not less than a predetermined value.

9. The roll angle estimation device according to claim 1, further comprising a y-axis acceleration error component estimator configured to estimate a y-axis acceleration error component, which is a steady-state error component included in a detection value of y-axis acceleration detected by said acceleration and angular velocity detector, wherein:

said correction value calculator is configured to include, as part of processing performed to calculate said correction value, processing for eliminating an estimated value of the y-axis acceleration error component estimated by said y-axis acceleration error component estimator from a detection value of y-axis acceleration detected by said acceleration and angular velocity detector; and said y-axis acceleration error component estimator includes forward travel determination device for determining whether or not said vehicle body is in a forward-traveling state, and is configured to obtain an estimated value of said y-axis acceleration error component on the basis of a detection value of y-axis acceleration detected by said acceleration and angular velocity detector, in a state where it is determined by the forward travel determination device that said vehicle body is in a forward-traveling state.

10. The roll angle estimation device according to claim 9, wherein
said forward travel determination device is configured to determine that said vehicle body is in a forward-traveling state when the following conditions are satisfied: a detection value of speed in the traveling direction detected by said vehicle speed detector is not lower than a predetermined speed; and a product of a detection value of z-axis angular velocity detected by said acceleration and angular velocity detector and a detection value of speed in the traveling direction detected by said vehicle speed detector is not larger than a predetermined value.

11. A device for successively estimating a roll angle of a vehicle body, comprising:
an acceleration and angular velocity detector including an acceleration sensor and an angular velocity sensor mounted on said vehicle body, and when an axis extending in the front-rear direction of the vehicle body, an axis extending in the vehicle width direction of the vehicle body, and an axis extending in the up-down direction of the vehicle body are respectively defined as an x axis, a y axis, and a z axis of a local coordinate system fixed to the vehicle body, configured to be capable of detecting x-axis acceleration which is acceleration in the x-axis direction, y-axis acceleration which is acceleration in the y-axis direction, x-axis angular velocity which is angular velocity about the x axis, and z-axis angular velocity which is angular velocity about the z axis;

a vehicle speed detector configured to detect a speed of said vehicle body in a traveling direction;

a pitch angle estimator configured to successively estimate a pitch angle of said vehicle body, and calculate an estimated value of the current pitch angle by use of a detection value of speed in the traveling direction detected by said vehicle speed detector, a detection value of x-axis acceleration detected by said acceleration and angular velocity detector, and a previous estimated value of said pitch angle;

a roll angle velocity estimator configured to successively estimate roll angle velocity of said vehicle body, and calculate an estimated value of the current roll angle velocity by use of detection values of x-axis angular velocity and z-axis angular velocity detected by said acceleration and angular velocity detector, a previous estimated value of said roll angle, and the previous estimated value of the pitch angle estimated by said pitch angle estimator;

a correction value calculator configured to successively calculate a correction value for estimating the roll angle of said vehicle body, and calculate said correction value by use of the detection value of speed in the traveling direction detected by said vehicle speed detector, detection values of z-axis angular velocity and y-axis acceleration detected by said acceleration and angular velocity detector, the previous estimated value of said roll angle, and the previous estimated value of the pitch angle estimated by said pitch angle estimator; and roll angle estimated value calculator configured to calculate an estimated value of the current roll angle of said vehicle body by correcting a value obtained by integrating the estimated value of said roll angle velocity estimated by said roll angle velocity estimator by use of the calculated value of the correction value calculated by said correction value calculator.

12. The roll angle estimation device according to claim 11, wherein said correction value calculator is configured to calculate an estimated value of said y-axis acceleration by use of a detection value of speed in the traveling direction detected by said vehicle speed detector, a detection value of z-axis angular velocity detected by said acceleration and angular velocity detector, a previous estimated value of said roll angle, and a previous estimated value of the pitch angle estimated by said pitch angle estimator, and then calculate said correction value according to a deviation between a detection value of y-axis acceleration detected by said acceleration and angular velocity detector and the estimated value of said y-axis acceleration, in such a manner as to bring the deviation closer to zero by a feedback control law.

13. The roll angle estimation device according to claim 12, further comprising x-axis acceleration error component estimator configured to estimate an x-axis acceleration error component which is a steady-state error component included in a detection value of x-axis acceleration detected by said acceleration and angular velocity detector, wherein:

said pitch angle estimator is configured to include, as part of processing performed to calculate an estimated value of said pitch angle, processing for eliminating an estimated value of the x-axis acceleration error component estimated by said x-axis acceleration error component estimator from a detection value of x-axis acceleration detected by said acceleration and angular velocity detector; and said x-axis acceleration error component estimator
includes error index value calculator for calculating an error index value, which varies according to said x-axis acceleration error component at the time of a turning motion of said vehicle body, by use of a previous estimated value of roll angle velocity estimated by said roll angle velocity estimator, a previous estimated value of the pitch angle estimated by said pitch angle estimator, a previous estimated value of the roll angle calculated by said roll angle estimated value calculator, detection values of y-axis acceleration and z-axis angular velocity detected by said acceleration and angular velocity detector, and a detection value of speed in the traveling direction detected by said vehicle speed detector, and
is configured to determine an estimated value of said x-axis acceleration error component in such a manner as to bring the error index value calculated by the error index value calculator closer to zero, during a predetermined time period immediately after start of a turning motion of said vehicle body.

14. The roll angle estimation device according to claim 12, further comprising a y-axis acceleration error component estimator configured to estimate a y-axis acceleration error component, which is a steady-state error component included in a detection value of y-axis acceleration detected by said acceleration and angular velocity detector, wherein:

said correction value calculator is configured to include, as part of processing performed to calculate said correction value, processing for eliminating an estimated value of the y-axis acceleration error component estimated by said y-axis acceleration error component estimator from a detection value of y-axis acceleration detected by said acceleration and angular velocity detector; and said y-axis acceleration error component estimator includes a forward travel determination device for determining whether or not said vehicle body is in a forward-traveling state, and is configured to obtain an estimated value of said y-axis acceleration error component on the basis of a detection value of y-axis acceleration detected by said acceleration and angular velocity detector, in a state where it is determined by the forward travel determination device that said vehicle body is in a forward-traveling state.

15. The roll angle estimation device according to claim 11, further comprising x-axis acceleration error component estimator configured to estimate an x-axis acceleration error component which is a steady-state error component included in a detection value of x-axis acceleration detected by said acceleration and angular velocity detector, wherein:

said pitch angle estimator is configured to include, as part of processing performed to calculate an estimated value of said pitch angle, processing for eliminating an estimated value of the x-axis acceleration error component estimated by said x-axis acceleration error component estimator from a detection value of x-axis acceleration detected by said acceleration and angular velocity detector; and said x-axis acceleration error component estimator
includes error index value calculator for calculating an error index value, which varies according to said x-axis acceleration error component at the time of a turning motion of said vehicle body, by use of a previous estimated value of roll angle velocity estimated by said roll angle velocity estimator, a previous estimated value of the pitch angle estimated by said pitch angle estimator, a previous estimated value of the roll angle calculated by said roll angle estimated value calculator, detection values of y-axis acceleration and z-axis angular velocity detected by said acceleration and angular velocity detector, and a detection value of speed in the traveling direction detected by said vehicle speed detector, and is configured to determine an estimated value of said x-axis acceleration error component in such a manner as to bring the error index value calculated by the error index value calculator closer to zero, during a predetermined time period immediately after start of a turning motion of said vehicle body.

16. The roll angle estimation device according to claim 15, wherein
said x-axis acceleration error component estimator is configured to calculate, as an estimated value of said x-axis acceleration error component, a value obtained by integrating said error index value during a predetermined time period immediately after start of a turning motion of said vehicle body.

17. The roll angle estimation device according to claim 15, wherein
said error index value calculator includes
a first filter for extracting a deviation variable component, which is a component that varies according to a turning motion of said vehicle body, from a deviation between the time rate of change of y-axis acceleration calculated from a previous estimated value of roll angle velocity estimated by said roll angle velocity estimator, a previous estimated value of the pitch angle estimated by said pitch angle estimator, and a previous estimated value of the roll angle calculated by said roll angle estimated value calculator, and the time rate of change of y-axis acceleration calculated from detection values of said y-axis acceleration and z-axis angular acceleration detected by said acceleration and angular velocity detector, a previous estimated value of roll angle velocity estimated by said roll angle velocity estimator, a previous estimated value of the pitch angle estimated by said pitch angle estimator, and a detection value of speed in the traveling direction detected by said vehicle speed detector, as well as
a second filter for extracting a z-axis angular velocity variable component, which is a component that varies according to a turning motion of said vehicle, from a detection value of z-axis angular velocity detected by said acceleration and angular velocity detector, and
is configured to calculate, as said error index value, a value obtained by multiplying the deviation variable component extracted by said first filter by the z-axis angular velocity variable component extracted by said second filter.

18. The roll angle estimation device according to claim 15, wherein
a predetermined time period immediately after start of a turning motion of said vehicle body is a time period in which a product of a detection value of z-axis angular velocity detected by said acceleration and angular velocity detector and the time rate of change of the detection value is a positive value not less than a predetermined value.

19. The roll angle estimation device according to claim 11, further comprising a y-axis acceleration error component estimator configured to estimate a y-axis acceleration error component, which is a steady-state error component included in a detection value of y-axis acceleration detected by said acceleration and angular velocity detector, wherein:
said correction value calculator is configured to include, as part of processing performed to calculate said correction value, processing for eliminating an estimated value of the y-axis acceleration error component estimated by said y-axis acceleration error component estimator from a detection value of y-axis acceleration detected by said acceleration and angular velocity detector; and
said y-axis acceleration error component estimator includes forward travel determination device for determining whether or not said vehicle body is in a forward-traveling state, and is configured to obtain an estimated value of said y-axis acceleration error component on the basis of a detection value of y-axis acceleration detected by said acceleration and angular velocity detector, in a state where it is determined by the forward travel determination device that said vehicle body is in a forward-traveling state.

20. The roll angle estimation device according to claim 19, wherein
said forward travel determination device is configured to determine that said vehicle body is in a forward-traveling state when the following conditions are satisfied: a detection value of speed in the traveling direction detected by said vehicle speed detector is not lower than a predetermined speed; and a product of a detection value of z-axis angular velocity detected by said acceleration and angular velocity detector and a detection value of speed in the traveling direction detected by said vehicle speed detector is not larger than a predetermined value.

* * * * *